(12) United States Patent
Lopez et al.

(10) Patent No.: US 9,843,041 B2
(45) Date of Patent: Dec. 12, 2017

(54) COATED POSITIVE ELECTRODE MATERIALS FOR LITHIUM ION BATTERIES

(75) Inventors: Herman A. Lopez, Sunnyvale, CA (US); Subramanian Venkatachalam, Pleasanton, CA (US); Deepak Kumaar Kandasamy Karthikeyan, Foster City, CA (US); Shabab Amiruddin, Fremont, CA (US); Sujeet Kumar, Newark, CA (US)

(73) Assignee: Zenlabs Energy, Inc., Fremont, CA (US)

(*) Notice: Subject to any disclaimer, the term of this patent is extended or adjusted under 35 U.S.C. 154(b) by 813 days.

(21) Appl. No.: 12/616,226

(22) Filed: Nov. 11, 2009

(65) Prior Publication Data

US 2011/0111298 A1    May 12, 2011

(51) Int. Cl.
*H01M 4/485*    (2010.01)
*H01M 4/131*    (2010.01)
*H01M 4/505*    (2010.01)
*H01M 4/525*    (2010.01)
(Continued)

(52) U.S. Cl.
CPC ............ *H01M 4/485* (2013.01); *C01G 53/50* (2013.01); *H01M 4/131* (2013.01); *H01M 4/505* (2013.01); *H01M 4/525* (2013.01); *H01M 10/0525* (2013.01); *C01P 2002/50* (2013.01); *C01P 2002/72* (2013.01); *C01P 2002/88* (2013.01); *C01P 2004/03* (2013.01); *C01P 2004/04* (2013.01); *C01P 2004/84* (2013.01);
(Continued)

(58) Field of Classification Search
CPC ...... H01M 4/485; H01M 4/131; H01M 4/505; H01M 4/525; H01M 10/0525; G01G 53/10
See application file for complete search history.

(56) References Cited

U.S. PATENT DOCUMENTS

| 4,957,543 A | 9/1990 | Babjak et al. |
| 5,374,491 A | 12/1994 | Brannan et al. |
| 5,658,693 A | 8/1997 | Thackeray et al. |

(Continued)

FOREIGN PATENT DOCUMENTS

| CN | 101156260 | 4/2008 |
| EP | 2264814 A1 | 12/2010 |

(Continued)

OTHER PUBLICATIONS

Search Report and Written Opinion for PCT application serial No. PCT/US2010/054119, dated Jul. 22, 2011.
(Continued)

*Primary Examiner* — Helen O Conley
(74) *Attorney, Agent, or Firm* — Christensen, Fonder, Dardi & Herbert PLLC; Peter S. Dardi

(57) ABSTRACT

High specific capacity lithium rich lithium metal oxide materials are coated with inorganic compositions, such as metal fluorides, to improve the performance of the materials as a positive electrode active material. The resulting coated material can exhibit an increased specific capacity, and the material can also exhibit improved cycling. The materials can be formed while maintaining a desired relatively high average voltage such that the materials are suitable for the formation of commercial batteries. Suitable processes are described for the synthesis of the desired coated compositions that can be adapted for commercial production.

17 Claims, 30 Drawing Sheets

(51) Int. Cl.
*H01M 10/0525* (2010.01)
*C01G 53/00* (2006.01)

(52) U.S. Cl.
CPC ....... *C01P 2006/11* (2013.01); *C01P 2006/40* (2013.01); *Y02T 10/7011* (2013.01)

(56) References Cited

U.S. PATENT DOCUMENTS

| | | |
|---|---|---|
| 5,674,645 A | 10/1997 | Amatucci et al. |
| 5,738,907 A | 4/1998 | Vaccaro et al. |
| 6,037,095 A | 3/2000 | Miyasaka |
| 6,045,948 A | 4/2000 | Wang et al. |
| 6,087,042 A | 7/2000 | Sugiyama et al. |
| 6,168,887 B1 | 1/2001 | Dahn et al. |
| 6,183,718 B1 | 2/2001 | Barker et al. |
| 6,248,477 B1 | 6/2001 | Howard, Jr. et al. |
| 6,251,822 B1 | 6/2001 | Peng et al. |
| 6,322,744 B1 | 11/2001 | Kelley et al. |
| 6,337,156 B1 | 1/2002 | Narang et al. |
| 6,372,385 B1 | 4/2002 | Kweon et al. |
| 6,383,687 B1 | 5/2002 | Gibbons et al. |
| 6,420,071 B1 | 7/2002 | Lee et al. |
| 6,428,766 B1 | 8/2002 | Fujino et al. |
| 6,489,060 B1 | 12/2002 | Zhang et al. |
| 6,528,208 B1 | 3/2003 | Thackeray et al. |
| 6,589,499 B2 | 7/2003 | Gao et al. |
| 6,596,435 B2 | 7/2003 | Kelley et al. |
| 6,660,432 B2 | 12/2003 | Paulsen et al. |
| 6,677,082 B2 | 1/2004 | Thackeray et al. |
| 6,680,143 B2 | 1/2004 | Thackeray et al. |
| 6,682,849 B2 | 1/2004 | Narang et al. |
| 6,730,429 B2 | 5/2004 | Thackeray et al. |
| 6,749,648 B1 | 6/2004 | Kumar et al. |
| 6,855,460 B2 | 2/2005 | Vaughey et al. |
| 6,872,491 B2 | 3/2005 | Kanai et al. |
| 6,964,828 B2 | 11/2005 | Lu et al. |
| 7,026,074 B2 | 4/2006 | Chen et al. |
| 7,078,128 B2 | 7/2006 | Lu et al. |
| 7,135,252 B2 | 11/2006 | Thackeray et al. |
| 7,166,385 B2 | 1/2007 | Ishida et al. |
| 7,201,994 B2 | 4/2007 | Watanabe et al. |
| 7,201,997 B2 | 4/2007 | Ishida et al. |
| 7,205,072 B2 | 4/2007 | Kang et al. |
| 7,229,717 B2 | 6/2007 | Yamaguchi et al. |
| 7,252,907 B2 | 8/2007 | Takeuchi et al. |
| 7,285,357 B2 | 10/2007 | Jordy et al. |
| 7,364,793 B2 | 4/2008 | Paulsen et al. |
| 7,368,071 B2 | 5/2008 | Dahn et al. |
| 7,393,476 B2 | 7/2008 | Shiozaki et al. |
| 7,416,813 B2 | 8/2008 | Fujihara et al. |
| 7,435,402 B2 | 10/2008 | Kang et al. |
| 7,452,631 B2 | 11/2008 | Kitao et al. |
| 7,468,223 B2 | 12/2008 | Thackeray et al. |
| 7,507,503 B2 | 3/2009 | Amine et al. |
| 7,517,613 B2 | 4/2009 | Yuasa et al. |
| 7,674,557 B2 | 3/2010 | Sun et al. |
| 7,927,506 B2 | 4/2011 | Park |
| 7,935,270 B2 | 5/2011 | Park |
| 2002/0055042 A1 | 5/2002 | Kweon et al. |
| 2002/0110736 A1 | 8/2002 | Kweon et al. |
| 2002/0114995 A1 | 8/2002 | Thackeray et al. |
| 2003/0082448 A1 | 5/2003 | Cho et al. |
| 2003/0087155 A1 | 5/2003 | Cho et al. |
| 2003/0108790 A1 | 6/2003 | Manithram et al. |
| 2004/0076884 A1 | 4/2004 | Lee et al. |
| 2004/0091779 A1 | 5/2004 | Kang et al. |
| 2004/0151951 A1 | 8/2004 | Hyung et al. |
| 2005/0019670 A1 | 1/2005 | Amine et al. |
| 2005/0031942 A1 | 2/2005 | Hennige et al. |
| 2005/0202316 A1 | 9/2005 | Hwang et al. |
| 2005/0220700 A1 | 10/2005 | Suhara et al. |
| 2006/0051671 A1 | 3/2006 | Thackeray et al. |
| 2006/0051673 A1 | 3/2006 | Johnson et al. |
| 2006/0083991 A1 | 4/2006 | Ahn et al. |
| 2006/0147809 A1 | 7/2006 | Amine et al. |
| 2006/0188781 A1 | 8/2006 | Thackeray et al. |
| 2006/0257743 A1 | 11/2006 | Kuratomi et al. |
| 2006/0275667 A1 | 12/2006 | Watanabe et al. |
| 2007/0072080 A1 | 3/2007 | Inagaki et al. |
| 2007/0111098 A1 | 5/2007 | Yang Kook et al. |
| 2007/0122703 A1 | 5/2007 | Whitfield et al. |
| 2007/0148544 A1 | 6/2007 | Le |
| 2007/0160906 A1 | 7/2007 | Tooyama et al. |
| 2007/0202405 A1 | 8/2007 | Shizuka et al. |
| 2007/0212607 A1 | 9/2007 | Fujihara et al. |
| 2007/0281212 A1 | 12/2007 | Thackeray et al. |
| 2007/0292757 A1 | 12/2007 | Watanabe et al. |
| 2008/0102369 A1 | 5/2008 | Sakata et al. |
| 2008/0107968 A1 | 5/2008 | Patoux et al. |
| 2008/0118847 A1 | 5/2008 | Jung et al. |
| 2008/0135802 A1 | 6/2008 | Saito et al. |
| 2008/0157027 A1 | 7/2008 | Manthiram et al. |
| 2008/0193841 A1 | 8/2008 | Sun et al. |
| 2008/0241693 A1 | 10/2008 | Fukuchi et al. |
| 2008/0268347 A1 | 10/2008 | Ohzuku et al. |
| 2009/0072818 A1 | 3/2009 | Mizuno et al. |
| 2009/0087362 A1 | 4/2009 | Sun et al. |
| 2009/0104532 A1 | 4/2009 | Hosoya |
| 2009/0127520 A1 | 5/2009 | Whitfield et al. |
| 2009/0155694 A1 | 6/2009 | Park |
| 2009/0253042 A1 | 10/2009 | Sun et al. |
| 2009/0263707 A1 | 10/2009 | Buckley et al. |
| 2009/0297947 A1 | 12/2009 | Deng et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0104944 A1 | 4/2010 | Saito et al. |
| 2010/0119942 A1 | 5/2010 | Kumar |
| 2010/0151332 A1 | 6/2010 | Lopez et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0111294 A1 | 5/2011 | Lopez et al. |
| 2011/0136019 A1 | 6/2011 | Amiruddin et al. |
| 2011/0236751 A1 | 9/2011 | Amiruddin et al. |
| 2011/0244331 A1 | 10/2011 | Karthikeyan et al. |
| 2012/0028105 A1 | 2/2012 | Kumar et al. |
| 2012/0056590 A1 | 3/2012 | Amiruddin et al. |
| 2012/0070725 A1 | 3/2012 | Venkatachalam et al. |
| 2012/0077082 A1 | 3/2012 | Se-Hee et al. |

FOREIGN PATENT DOCUMENTS

| | | |
|---|---|---|
| EP | 2351122 | 8/2011 |
| EP | 2499687 | 9/2012 |
| JP | 57065674 A2 | 4/1982 |
| JP | 06-243871 | 9/1994 |
| JP | 09-045373 | 2/1997 |
| JP | 10-255837 | 9/1998 |
| JP | 3112138 | 9/2000 |
| JP | 3157413 B2 | 4/2001 |
| JP | 2001-143703 | 5/2001 |
| JP | 3172388 B2 | 6/2001 |
| JP | 2002-110167 | 4/2002 |
| JP | 2002-158011 | 5/2002 |
| JP | 2003-221234 | 8/2003 |
| JP | 3506397 | 12/2003 |
| JP | 2005-310744 | 11/2005 |
| JP | 2006-134816 | 5/2006 |
| JP | 2006-261127 | 9/2006 |
| JP | 2006-261132 | 9/2006 |
| JP | 2006-344425 A | 12/2006 |
| JP | 2007-220630 | 8/2007 |
| JP | 3276451 | 2/2008 |
| JP | 2008-536285 A | 9/2008 |
| JP | 2008-251480 | 10/2008 |
| JP | 2008-258160 A | 10/2008 |
| JP | 5023541 | 6/2012 |
| KR | 10-2005-0111764 | 11/2005 |
| KR | 10-0578877 | 5/2006 |
| KR | 10-2007-0117827 A | 12/2007 |
| KR | 10-0796953 | 1/2008 |
| KR | 10-0822013 | 4/2008 |

(56) References Cited

FOREIGN PATENT DOCUMENTS

| KR | 10-2008-0099132 A | 11/2008 |
|---|---|---|
| KR | 10-2009-0078128 A | 7/2009 |
| KR | 10-2010-0007236 | 1/2010 |
| WO | 99/60638 A1 | 11/1999 |
| WO | 01/35473 A1 | 5/2001 |
| WO | 01/91209 A1 | 11/2001 |
| WO | 2004/084330 A2 | 9/2004 |
| WO | 2005/119820 A1 | 12/2005 |
| WO | 2006/025707 A1 | 3/2006 |
| WO | 2006/109930 A1 | 10/2006 |
| WO | 2006/137673 A1 | 12/2006 |
| WO | 2008/086041 A1 | 7/2008 |

OTHER PUBLICATIONS

Aurbach et al., "On the capacity fading of LiCoO2 intercalation electrodes: the effect of cycling, storage, temperature, and surface film forming additives," Electrochimica Acta 47 (2002) 4291-4306.

Chen et al., "Studies of LiCoO2 Coated with Metal Oxides," Electrochemical and Solid State Letters, 6 (11) A221-A224 (2003).

Chen et al., "Effect of a ZrO2 Coating on the Structure and Electrochemistry of LixCoO2 When Cycled to 4.5 V," Electrochemical and Solid State Letters, 5 (10) A213-A216 (2002).

Cho et al., "Comparison of Al2O3- and AlPO4-coated LiCoO2 cathode materials for a Li-ion cell," J. of Power Sources 146 (2005) 58-64.

Cho et al., "LiCoO2 Cathode Material That Does Not Show a Phase Transition from Hexagonal to Monoclinic Phase," J. of The Electrochemical Society, 148 (10) A1110-A1115 (2001).

Cho et al., "High-Performance ZrO2-Coated LiNiO2 Cathode Material," Electrochemical and Solid-State Letters, 4 (10) A159-A161 (2001).

Cho et al., "Zero-Strain Intercalation Cathode for Rechargeable Li-Ion Cell," Angew. Chem. Int. Ed. 2001, 40 (18): 3367-3369.

Cho et al., "Novel LiCoO Cathode Material with AlO Coating for a Li Ion Cell," Chem. Mater., 2000 12 (12), 3788-3791.

Fey et al., "Enhanced cyclability of LiCoO2 cathodes coated with alumina drived from carboxylate-alumoxanes," J. of Applied Electrochemistry (2005) 35:177-184.

Fey et al., "Preformed boehmite nanoparticles as coating materials for long-cycling LiCoO2," J. of Applied Electrochemistry 34:715-722 (2004).

Fey et al., "A simple mechano-thermal coating process for improved lithium battery cathode materials," J. of Power Sources 132 (2004) 172-180.

Fey et al., "Saturated linear dicarboxylic acids as chelating agents for the sol-gel synthesis of LiNi0.8Co0.2O2," Materials Chemistry and Physics 87 (2004) 246-255.

Hwang et al. "Influence of Mn content on the morphology and electrochemical performance of LiNi1-x-yCoxMnyO2 cathode materials," J. Mater. Chem., 2003; 13:1962-1968.

Kang et al., "Enchancing the rate capability of high capacity xLi2MnO3 . (1–x)LiMO2 (M=Mn, Ni, Co) electrodes by Li—Ni—PO4 treatment," Electrochemistry Communications 11 (2009) 748-751.

Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.

Kim et al., "Synthesis of spherical Li[Ni(1–3–z)Co(1/3–z)Mn(1/3–z)Mgz]O2 as positive electrode material for lithium ion battery," Electrchimica Acta 51 (2006) 2447-2453.

Kim et al., "Improvement of High-Voltage Cycling Behavior of Surface Modified Li[Ni1/3Co1/3Mn1/3]O2 Cathodes by Fluorine Substitution for Li-Ion Batteries," Journal of the Electrochemical Society 152 (9) A1701-A1713 (2005).

Kim et al., "Electrochemical Stability of Thin-Film LiCoO Cathodes by Aluminum-Oxide Coating," Chem. Mater. 2003, 15(7):1505-1511.

Lee et al., "High capacity Li[Li0.2Ni0.2Mn0.6]O2 cathode materials via a carbonate co-precipitation method," J. of Power Sources, 162 (2006) 1346-1350.

Lee et al., "Electrochemical characteristics of Al2O3-coated lithium manganese spinel as a cathode material for a lithium secondary battery," J. of Power Sources 126 (2004) 150-155.

Okumura et al., "Cathode having high rate performance for a secondary Li-ion cell surface-modified by aluminum oxide nanoparticles," J. of Power Sources 189 (2009) 471-475.

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "Significant Improvement of high voltage cycling behavior AlF3-coated LiCoO2 cathode," Electrochemistry Communications 8 (2006) 821-826.

Thackeray et al., "Li2MnO3-stabilized LiMO2 (M=Mn, Ni, Co) electrodes for lithium-ion batteries," J. Mater. Chem., 2007; 17:3112-3125.

Thackeray et al., "Comments on the structural complexity of lithium-rich Li1+xM1−xO2 electrodes (M=Mn, Ni, Co) for lithium batteries," Electrochemistry Communications 8 (2006), 1531-1538.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1−x)/3Mn(2−x)/3Nix/3Cox/3]O2 Cathodes with Low Irreversible Capacity Loss," Electrochemical and Solid State Letters, 9 (5) A221-A224 (2006).

Armstrong et al., "Demonstrating Oxygen Loss and Associated Structural Reorganization in the Lithium Battery Cathode Li[NiLiMn]O," J. Am. Chem. Soc., 2006, 128 (26), 8694-8698.

Aurbach et al. "Studies of cycling behavior, ageing, and interfacial reactions of LiNi0.5Mn1.5O4 and carbon electrodes for lithium-ion 5-V cells," J. of Power Sources 162 (2006) 780-789.

Choi et al., "Superior Capacity Retention Spinel Oxyfluoride Cathodes for Lithium-Ion Batteries," Electrochemical and Solid-State Letters 9 (5) (2006) A245-A248.

Ho et al., "Application of A-C Techniques to the Study of Lithium Diffusion in Tungsten Trioxide Thin Films," J. Electrochem. Soc., 1980; 127(2):343-350.

Ito et al., "The relationship between crystal structure and the electrochemical reaction of Li-rich insertion materials (2)" 2010.

Johnson et al. "The significance of the Li2MnO3 component in 'composite' xLi2MnO3 • (1−x)LiMn0.5Ni0.5O2 electrodes," Electrochemistry Communications 6 (2004) 1085-1091.

Kim et al., "Remarkable improvement in cell safety for Li[Ni0.5Co0.2Mn0.3]O2 coated with LiFePO4," Journal of Alloys and Compounds 492 (2010) L87-L90.

Kim et al., "Electrochemical and Structural Properties of xLi2M'O3•(1−x)LiMn0.5Ni0.5O2 Electrodes for Lithium Batteries (M'=Ti, Mn, Zr; 0≤x≥0.3)" Chem. Mater. 2004, 16, 1996-2006.

Luo et al., "On the incorporation of fluorine into the manganese spinel cathode lattice," Solid State Ionics 180 (2009) 703-707.

Myung et al., "Effect of AlF3 Coating on Thermal Behavior of Chemically Delithiated Li0.35[Ni1/3Co1/3Mn1/3]O2," J Phys. Chem. C, 114 (10): 4710-4718 (2010).

Ohsawa et al., "The relationship between crystal structure and the electrochemical reaction of Li-rich insertion materials (1)," 2010.

Park et al., "Lithium-manganese-nickel-oxide electrodes with integrated layered-spinel structures for lithium batteries," Electrochemistry Communications 9 (2007) 262-268.

Ruberto, "Metastable Alumina from Theory: Bulk, Surface, and Growth of κ-Al2O3," Thesis for the Degree of Doctor of Philosophy, Department of Applied Physics, Chalmers University of Technology and Goteborg University, 2001.

Song et al., "Two- and three-electrode impedance spectroscopy of lithium-ion batteries," J. of Power Sources, 2002; 111:255-267.

Sun et al., "The preparation and electrochemical performance of solid solutions LiCoO2—Li2MnO3 as cathode materials for lithium ion batteries," J of Power Sources 159 (2006) 1353-1359.

(56) References Cited

OTHER PUBLICATIONS

Thackeray et al., "Advances in manganese-oxide 'composite' electrodes for lithium-ion batteries," J. Mater. Chem., 2005,15, 2257-2267.
Yabuuchi et al., "Study of LiMnO3—Li(Co1/3Ni1/3Mn1/3)O2 for High Capacity Positive Electrode Material: II. Redox Reaction at the Positive Electrode/Electrolyte Interface," 2010.
Yoshii et al., "Study of LiMnO3—Li(Co1/3Ni1/3Mn1/3)O2 for High Capacity Positive Electrode Material: I. Change in the Crystal and Electronic Structure upon Li de-intercalation," 2010.
Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155 (10)A775-A782 (2008).
Boulineau et al., "Reinvestigation of Li2MnO3 Structure: Electron Diffraction and High Resolution TEM," Chem. Mater. 2009, 21, 4216-4222.
Hong et al., "Structural evolution of layered Li1.2Ni0.2Mn0.6O2 upon electrochemical cycling in a Li rechargeable battery," J. Mater. Chem., 2010, 20, 10179-10186.
Johnson et al., "Lithium-manganese oxide electrodes with layered-spinel composite structures xLi2MnO3•(1−x)Li1+yMn2−yO4 (0<x<1, 0≤y≤0.33) for lithium batteries," Electrochemistry Communications 7 (2005) 528-536.
Kang et al., "The Effects of Acid Treatment on the Electrochemical Properties of 0.5 Li2MnO3•0.5LiNi0.44Co0.25Mn0.31O2 Electrodes in Lithium Cells," Journal of the Electrochemical Society 153(6):A1186-A1192 (2006).
Park et al., "Physical and electrochemical properties of spherical Li1+x(Ni1/3Co1/3Mn1/3)1−xO2 cathode materials", Journal of Power Sources, 177:177-183 (2008).
Robertson et al., "Mechanism of Electrochemical Activity in Li2MnO3," Chem. Mater. 2003, 15, 1984-1992.
Yabuuchi et al., "Detailed Studies of a High-Capacity Electrode Material for Rechargeable Batteries, Li2MnO3—LiCo1/3Ni1/3Mn1/3O2," J. Am. Chem. Soc. 2011, 133, 4404-4419.

Shin et al., "Improvement of electrochemical properties of Li[Ni0.4Co0.2Mn(0.4−x)]O2−yFy cathode materials at high voltage region", Electrochimica Acta 52 1477-1482 (2006).
Ito et al., "Cyclic deterioration and it's improvement for Li-rich layered cathode material Li [Ni0.17Li0.2Co0.07Mn0.56]O2," Journal of Power Sources, 195: 567-573 (2010).
Ito et al., "A new approach to improve the high-voltage cyclic performance of Li-rich layered cathode material by electrochemical pretreatment," Journal of Power Sources 183: 344-346 (2008).
Jung et al, "Ultrathin Direct Atomic Layer Deposition on Composite Electrodes for Highly Durable and Safe Li-Ion Batteries," Advanced Materials, 22:2172-2176 (2010).
Jung et al, "Enhanced Stability of LiCoO2 Cathodes in Lithium-Ion Batteries Using Surface Modification by Atomic Layer Deposition," Journal of The Electrochemical Society, 157(1):A75-A81 (2010).
Riley et al, "Improved Mechanical Integrity of ALD-Coated Composite Electrodes for Li-Ion Batteries," Electrochemical and Solid-State Letters, 14(3):A29-A31 (2011).
Sun et al., "Effect of AlF3 coating amount on high voltage cycling performance of LiCoO2," Electrochimica Acta 53:1013-1019 (2007).
Wang et al., "High capacity double-layer surface modified Li[Li0.2Mn0.54Ni0.13Co0.13]O2 cathode with improved rate capability," J. Mater. Chem., 19:4965-4972 (2009).
Office Action for corresponding Taiwan Patent Application No. 099138870, dated May 9, 2013.
Shin et al., "Synthesis and electrochemical properties of Li[Li(1−2x)/3NixMn(2−x)/3]O2 as cathode materials for lithium secondary batteries," Journal of Power Sources 112: 634-638 (2002).
Jiang et. al. "Structure, Electrochemical Properties, and Thermal Stability Studies of Cathode Materials in the xLi [Mn1/2Ni1/2]O2•yLiCoO2•zLi[Li1/3Mn2/3]O2 Pseudoternary System (x+y+z=1)," Journal of the Electrochemical Society, 152(9): A1879-A1889 (2005).
Supplementary European Search Report from European Patent Application No. 10830424.7, dated Mar. 11, 2014.
Office Action from corresponding Chinese Patent Application No. 20108005106066.6, dated Apr. 7, 2014.

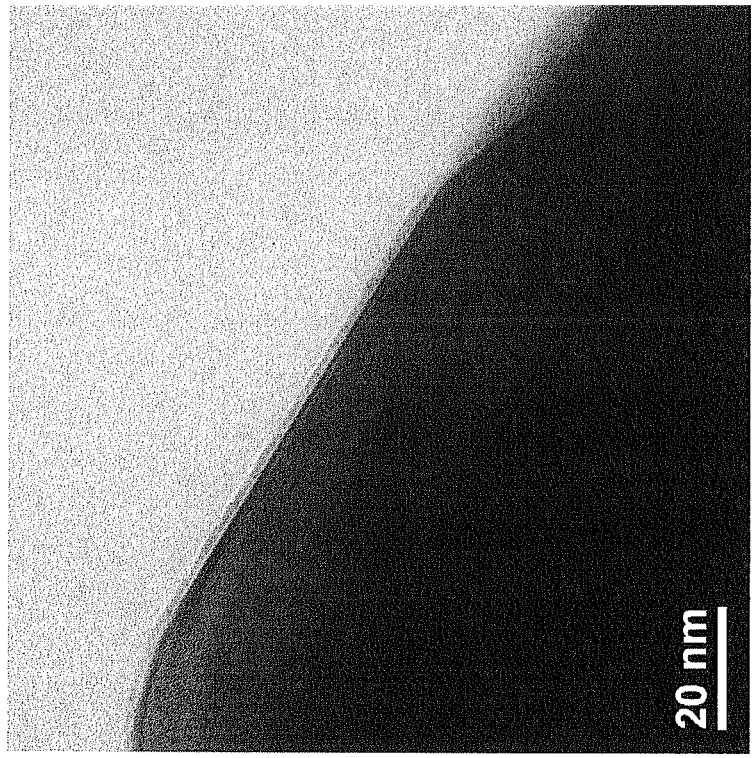
B. ~2nm SrF$_2$ coating
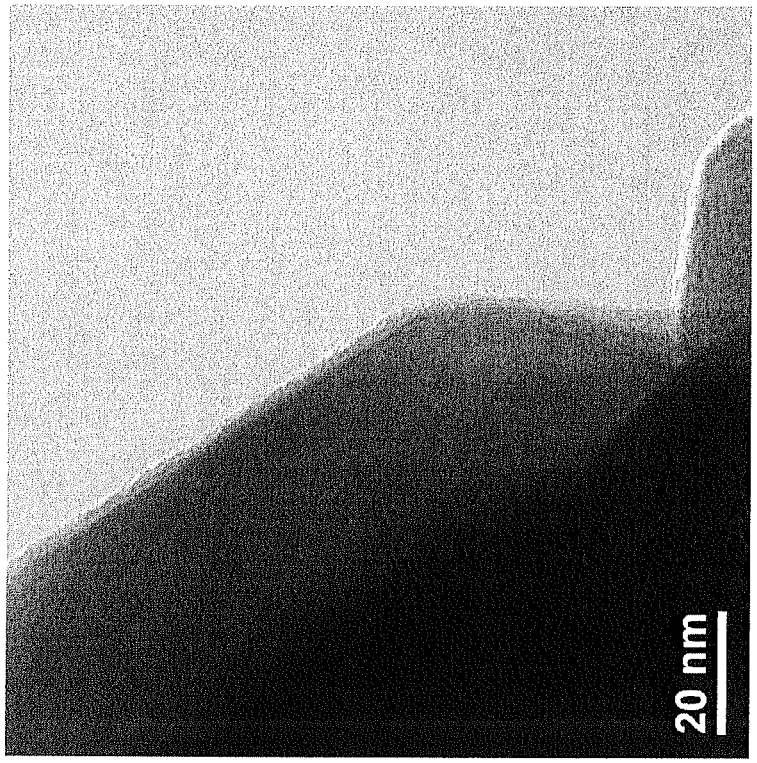
A. ~3nm MgF$_2$ coating
Fig. 18

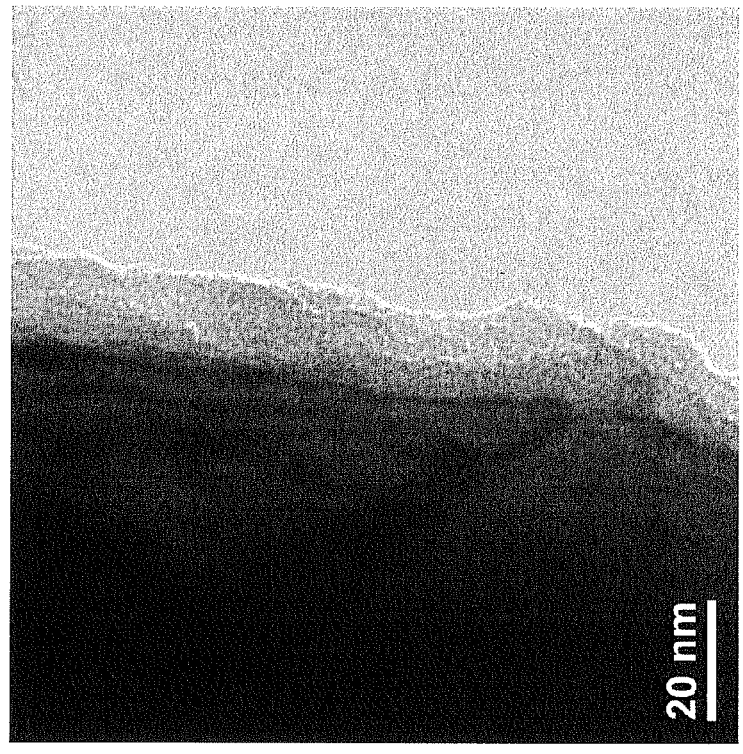
(B) ~17nm AlF$_3$ coating
Fig. 26
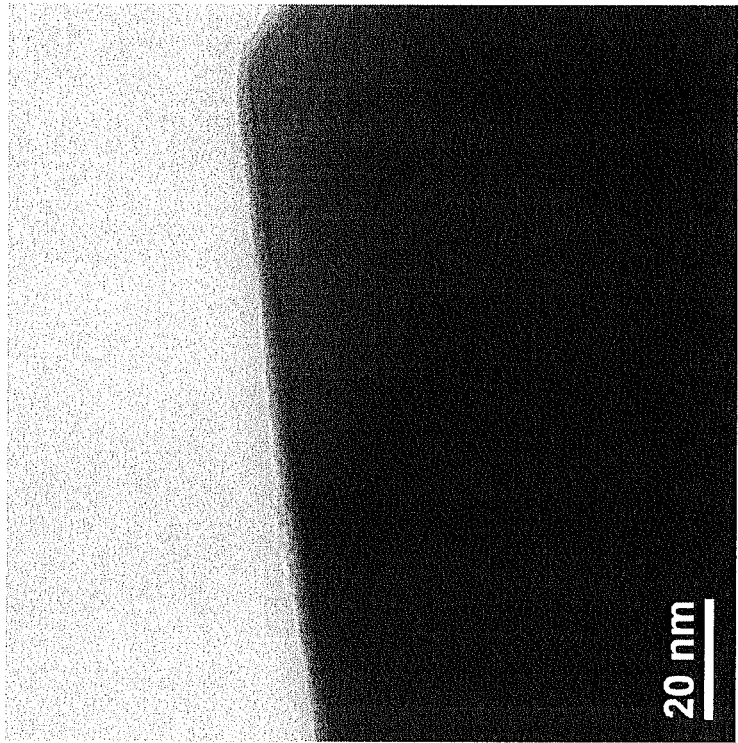
(A) ~3nm AlF$_3$ coating

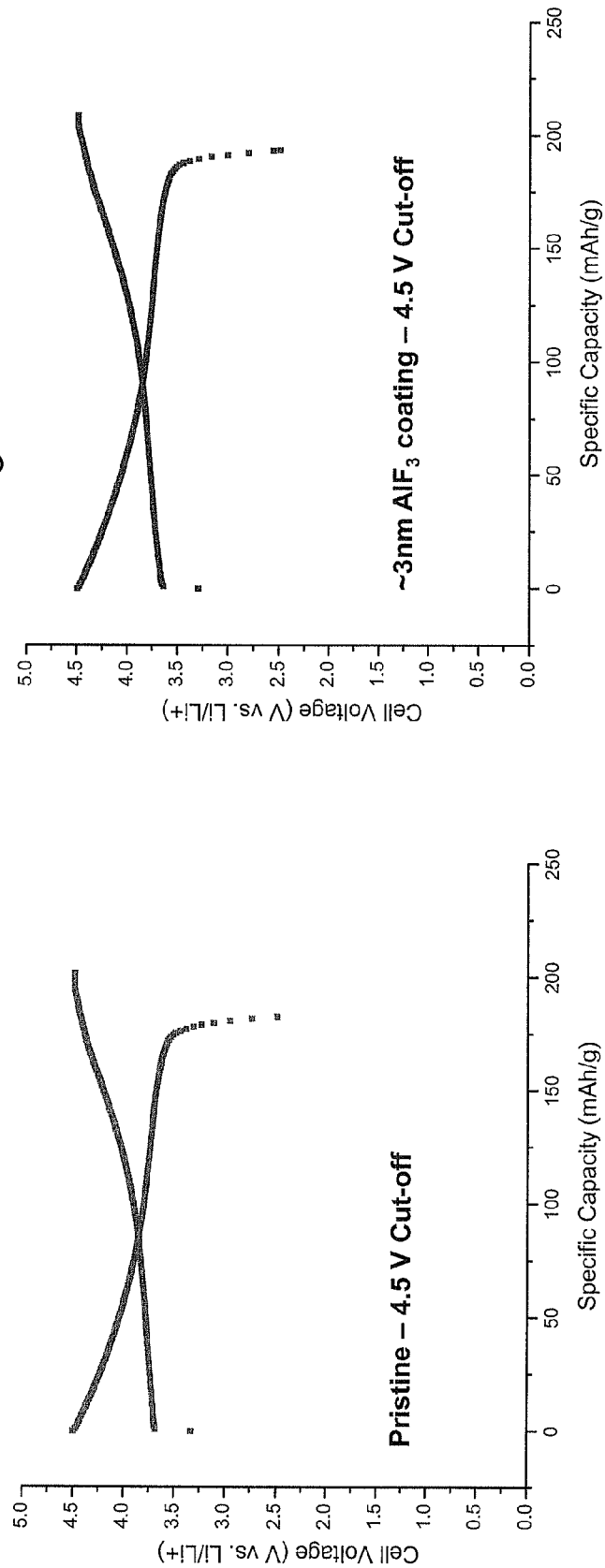

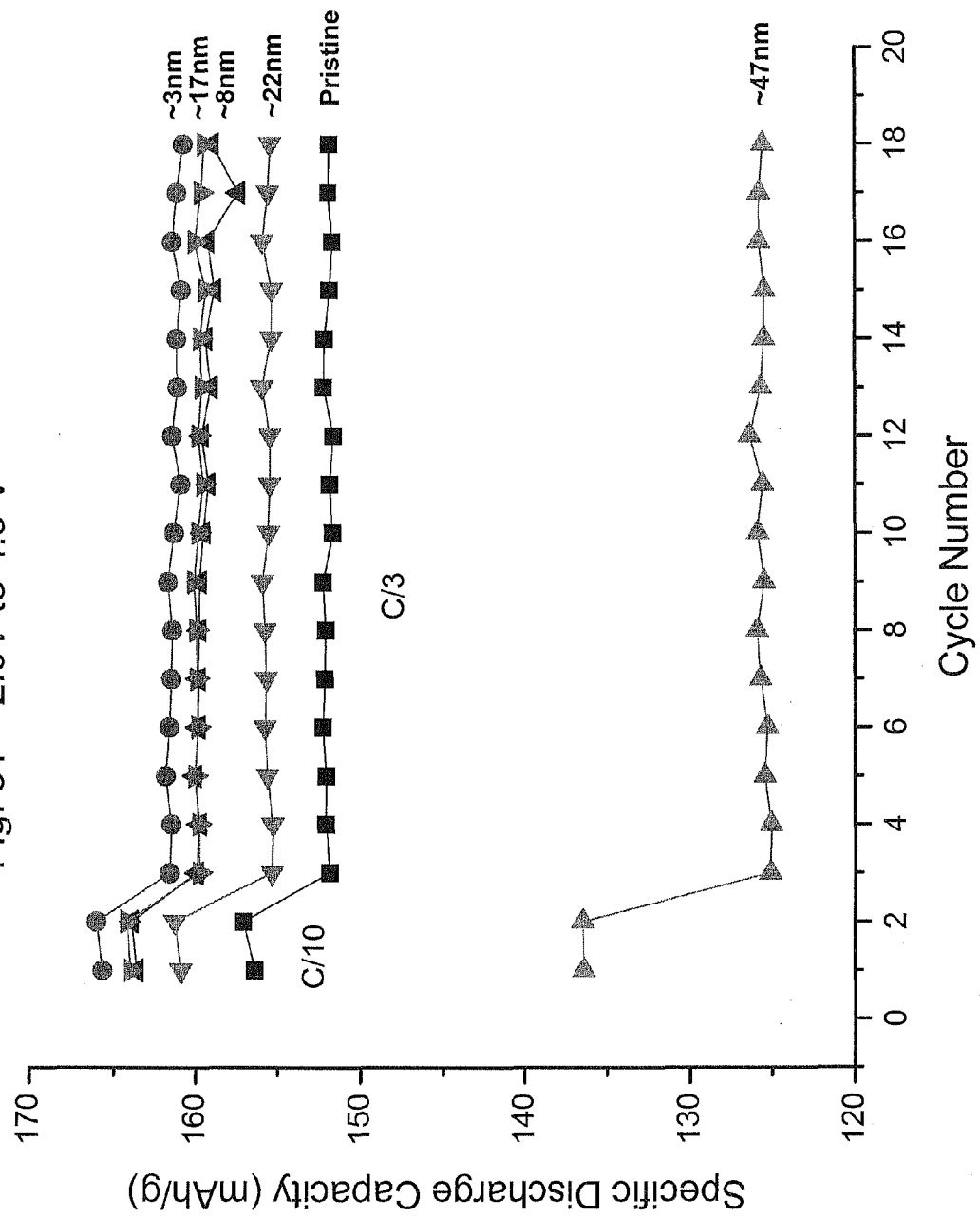

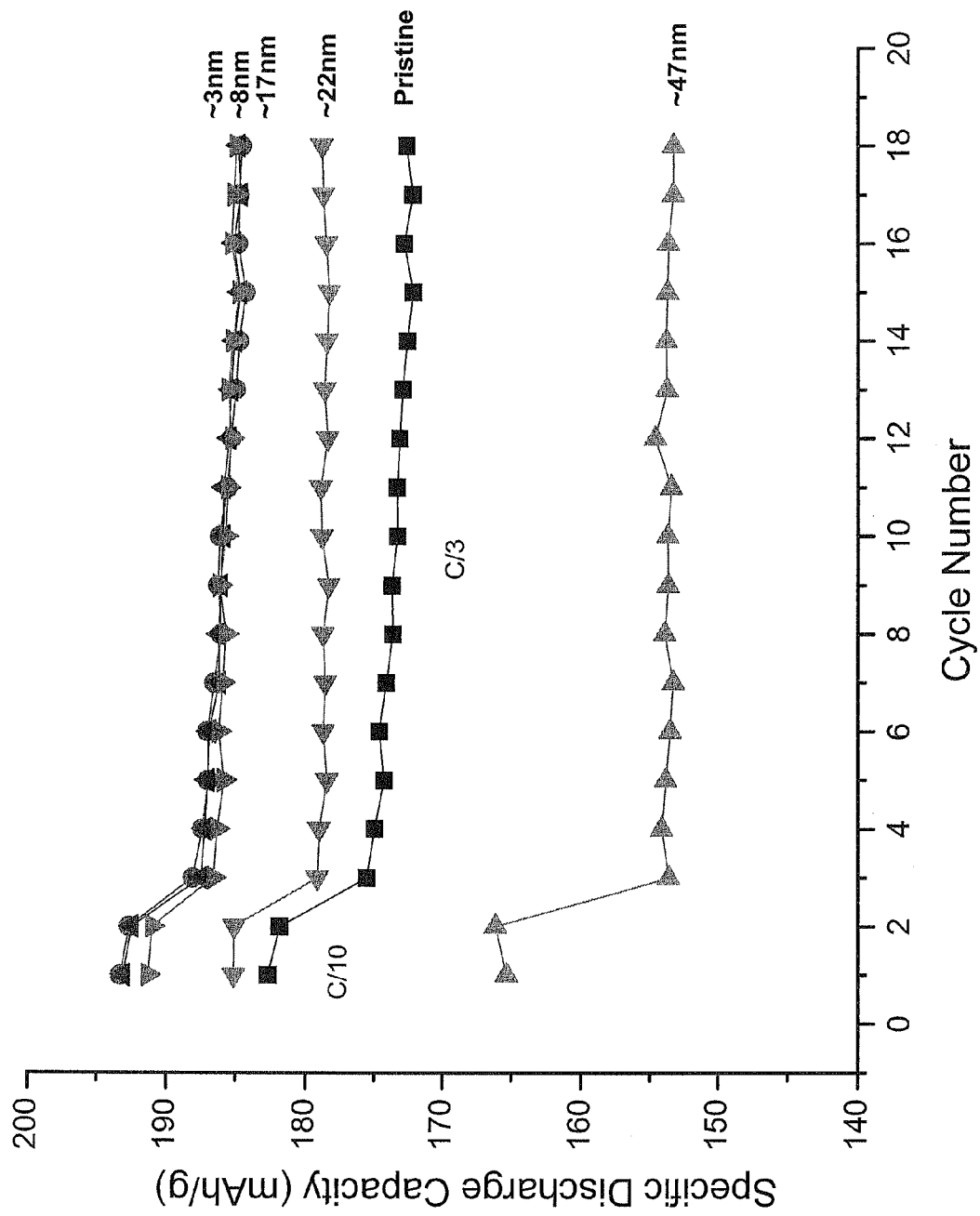

COATED POSITIVE ELECTRODE MATERIALS FOR LITHIUM ION BATTERIES

FIELD OF THE INVENTION

The invention relates to coated positive electrode active materials for lithium ion batteries, and in particular lithium rich positive electrode active materials with an inert coating. The invention further relates to batteries with improved performance properties as a result of selected coating of the positive electrode active materials.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that incorporates lithium when the battery is charged. For some current commercial batteries, the negative electrode material can be graphite, and the positive electrode material can comprise lithium cobalt oxide (LiCoO$_2$). In practice, only a modest fraction of the theoretical capacity of the positive electrode active material generally can be used. At least two other lithium-based positive electrode active materials are also currently in commercial use. These two materials are LiMn$_2$O$_4$, having a spinel structure, and LiFePO$_4$, having an olivine structure. These other materials have not provided any significant improvements in energy density.

Lithium ion batteries are generally classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

SUMMARY OF THE INVENTION

In a first aspect, the invention pertains to a lithium ion battery positive electrode material comprising an active composition represented by the formula Li$_{1+x}$M$_{1-x}$O$_2$, where M is a metal element or a combination thereof and $0.01 \leq x \leq 0.3$, coated with an inorganic coating composition wherein the coating composition comprises a metal/metalloid fluoride.

In a further aspect, the invention pertains to a lithium ion battery comprising a positive electrode, a negative electrode comprising a lithium incorporation composition, a separator between the positive electrode and the negative electrode and an electrolyte comprising lithium ions. Generally, the positive electrode comprises an active material, distinct electrically conductive powders and a polymer binder, wherein the positive electrode active material comprises an active composition coated with an inorganic coating composition. The positive electrode active material can have a discharge specific capacity of at least about 190 mAh/g with a discharge rate of 2 C from 4.6 volts to 2.0 volts at room temperature for the fifteenth charge/discharge cycle. In some embodiments, the active composition can be approximately represented by the formula Li$_{1+x}$M$_{1-x}$O$_2$, where M is a metal element or a combination thereof and $0.01 \leq x \leq 0.3$, coated with an inorganic coating composition.

In another aspect, the invention pertains to a lithium ion battery comprising a positive electrode, a negative electrode comprising a lithium incorporation composition and a separator between the positive electrode and the negative electrode, in which the positive electrode comprises an active material having an active composition coated with an inorganic composition, distinct electrically conductive powers and a polymer binder. The positive electrode active material can have a discharge specific capacity of at least about 245 mAh/g, an average voltage of at least about 3.55 volts and a capacity at 40 cycles that is at least about 90% of the capacity at 10 cycles with a discharge rate of C/3 from 4.6 volts to 2.0 volts at room temperature.

BRIEF DESCRIPTION OF THE DRAWINGS

FIG. 18 is a set of transmission electron micrographs showing the coating for (A) $MgF_2$ with an average thickness of about 3 nm and for (B) $SrF_2$ with an average thickness of about 2 nm.

FIG. 26 is a set of two transmission electron micrographs showing $AlF_3$ coatings on a second lithium rich active material with an average thickness of about 3 nm (A) and about 17 nm (B).

FIG. 29 is a plot of cell voltage versus specific capacity for the first charge and discharge cycle at a rate of C/10 for a battery formed with the alternative positive electrode active material with cycling between 2.0V and 4.5V.

FIG. 30 is a plot of cell voltage versus specific capacity for the first charge and discharge cycle at a rate of C/10 for a battery formed with the alternative positive electrode active material having an $AlF_3$ coating with cycling between 2.0V and 4.5V.

FIG. 31 is a set comparison plots of specific discharge capacity versus cycle number for the alternative positive active material, uncoated and five different $AlF_3$ coating thicknesses cycled at 0.1 C for the first two cycles and 0.33 C for cycle 3-18.

FIG. 32 is a set comparison plots of specific discharge capacity versus cycle number for the alternative positive electrode active material, uncoated and five different $AlF_3$ coating thicknesses cycled between 2.0V and 4.5V at 0.1 C for the first two cycles and 0.33 C for cycle 3-18.

DETAILED DESCRIPTION OF THE INVENTION

Figure 1:
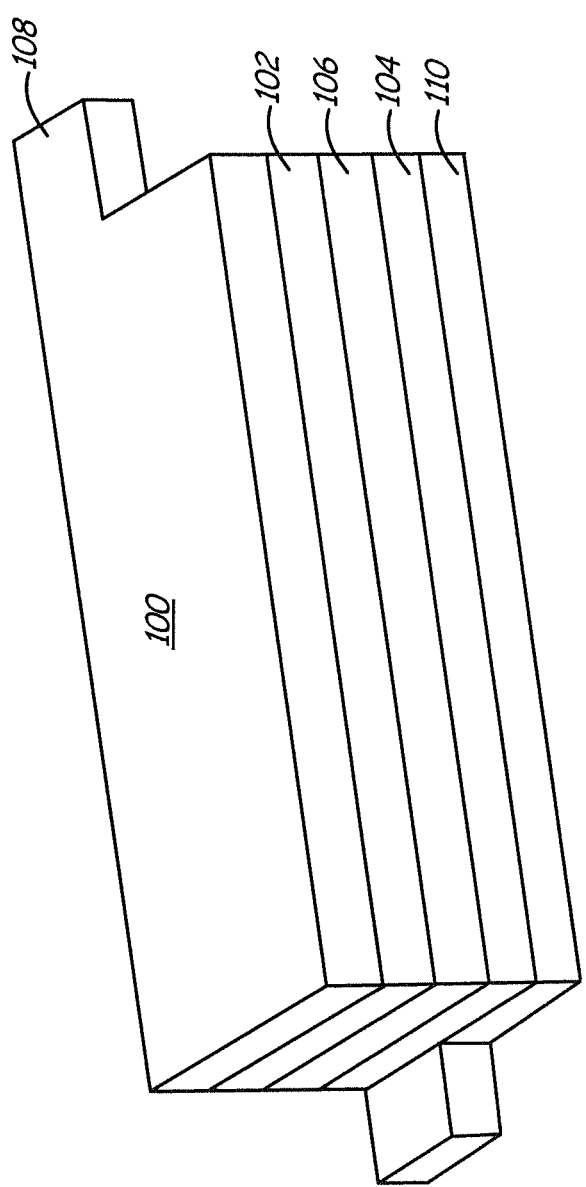
FIG. 1 is a schematic drawing of a battery structure separated from a container.

It has been discovered that lithium rich metal oxides can be effectively coated at relatively small thicknesses with metalloid fluoride coatings to significantly improve the performance of the resulting lithium ion batteries. The lithium rich metal oxides are capable of being stably charged to high voltages with resulting higher discharge capacities relative to some lower voltage materials. The coatings can improve a range of properties of the resulting batteries. In particular, the coated materials can exhibit high average voltages that can provide a more consistent voltage over a wide range of the battery capacity. The materials can be synthesized effectively using techniques that are readily scalable for commercial production. In addition, the materials can be synthesized at high tap densities, such that the resulting batteries can exhibit high effective capacities for a given battery volume. Furthermore, the batteries exhibit high specific capacities and excellent cycling at moderate rate charging and discharging. Thin inert metal oxide or metal phosphate coatings can also provide desired performance properties for resulting batteries formed with the materials. Therefore, the materials can be effectively used for commercial applications involving moderate discharge rate capability, such as plug in hybrid electric vehicles.

Lithium ion batteries described herein have achieved improved cycling performance while exhibiting high specific capacity and high overall capacity. Suitable synthesis techniques for the lithium rich metal oxides include, for example, co-precipitation approaches or sol-gel synthesis. Use of a metal fluoride coating, a metal oxide coating or other suitable coatings provides enhanced cycling performance. The positive electrode materials also exhibit a high average voltage over a discharge cycle so that the batteries have high power output along with a high specific capacity. The materials can also exhibit high specific capacities at surprisingly high rates, such as 2 C discharge rates. As a result of a relatively high tap density and excellent cycling performance, the battery exhibit continuing high capacity when cycled. Furthermore, the positive electrode materials demonstrate a reduced amount of irreversible capacity loss during the first charge and discharge cycle of the battery so that negative electrode material can be correspondingly reduced. The combination of excellent cycling performance, high specific capacity, and high overall capacity make these resulting lithium ion batteries an improved power source, particularly for high energy applications, such as electric vehicles, plug in hybrid vehicles and the like.

The batteries described herein are lithium ion batteries in which a non-aqueous electrolyte solution comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the positive electrode takes up lithium ions through intercalation or a similar process during discharge such that the positive electrode functions as a cathode which consumes electrons during discharge. Upon recharging of the secondary battery, the flow of lithium ions is reversed through the battery with the negative electrode taking up lithium and with the positive electrode releasing lithium as lithium ions. Generally, the batteries are formed with lithium ions in the positive electrode material such that an initial charge of the battery transfers a significant fraction of the lithium from the positive electrode material to the negative electrode material to prepare the battery for discharge.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

In some embodiments, the lithium ion batteries can use a positive electrode active material that is lithium rich relative to a reference homogenous electroactive lithium metal oxide composition. In some embodiments, the excess lithium can be referenced relative to a composition $LiMO_2$, where M is one or more metals with an average oxidation state of +3. The additional lithium in the initial cathode material provides corresponding additional lithium that can be transferred to the negative electrode during charging that can increase the battery capacity for a given weight of cathode active material. In some embodiments, the additional lithium is accessed at higher voltages such that the initial charge takes place at a higher voltage to access the additional capacity represented by the additional lithium of the positive electrode.

It is believed that appropriately formed lithium-rich lithium metal oxides have a composite crystal structure in which the excess lithium supports the formation of an alternative crystalline phase. For example, in some embodiments of lithium rich materials, a $Li_2MnO_3$ material may be structurally integrated with either a layered $LiMnO_2$ component or similar composite compositions with the manganese cations substituted with other transition metal cations with appropriate oxidation states. In some embodiments, the positive electrode material can be represented in two component notation as $x\,Li_2M'O_3 \cdot (1-x)LiMO_2$ where M is one or more metal cations with an average valance of +3 with at least one cation being a Mn ion or a Ni ion and where M' is one or more metal cations with an average valance of +4. These compositions are described further, for example, in U.S. Pat. No. 6,680,143 to Thackeray et al., entitled "Lithium Metal Oxide Electrodes for Lithium Cells and Batteries," incorporated herein by reference. Positive electrode active materials of particular interest have a formula $Li_{1+x}Ni_\alpha Mn_\beta Co_\gamma A_\delta O_2$, where x ranges from about 0.05 to about 0.3, $\alpha$ ranges from about 0.1 to about 0.4, $\beta$ range from about 0.3 to about 0.65, $\gamma$ ranges from about 0 to about 0.4, and $\delta$ ranges from about 0 to about 0.15, and where A is Mg, Sr, Ba, Cd, Zn, Al, Ga, B, Zr, Ti, Ca, Ce, Y, Nb, Cr, Fe, V, Li or combinations thereof.

Furthermore, surprisingly large capacities have been obtained for $Li[Li_{0.2}Ni_{0.175}Co_{0.10}Mn_{0.525}]O_2$, as presented in copending U.S. patent application Ser. No. 12/332,735, now U.S. Pat. No. 8,465,873, to Lopez et al. (the '735 application) entitled "Positive Electrode Material for High Specific Discharge Capacity Lithium Ion Batteries", incorporated herein by reference. The materials in the '735 application were synthesized using a carbonate co-precipitation process. Also, very high specific capacities were obtained for this composition using hydroxide co-precipitation and sol gel synthesis approaches as described in U.S. application Ser. No. 12/246,814, now U.S. Pat. No. 8,389,160, to Venkatachalam et al. (the '814 application) entitled "Positive Electrode Material for Lithium Ion Batteries Having a High Specific Discharge Capacity and Processes for the Synthesis of these Materials", incorporated herein by reference. These compositions have a low risk of fire for improved safety properties due to their specific compositions with a layered structure and reduced amounts of nickel relative to some other high capacity cathode materials. These compositions use low amounts of elements that are less desirable from an environmental perspective, and can be produced from starting materials that have reasonable cost for commercial scale production.

A carbonate co-precipitation process has been performed for the desired lithium rich metal oxide materials described herein having nickel, cobalt and manganese cations in the composition and exhibiting the high specific capacity performance. In addition to the high specific capacity, the materials exhibit superior tap density which leads to high overall capacity of the material in fixed volume applications. As demonstrated in the examples below, the lithium rich metal oxide materials formed with the carbonate co-precipitation process have improved performance properties. Specifically, the specific lithium rich composition of the previous paragraph formed by the carbonate co-precipitation process is used in coated forms to generate the results in the Examples below.

When the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change significantly with cycling. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss is the difference between the charge capacity of the new battery and the first discharge capacity. To compensate for this first cycle irreversible capacity loss, extra electroactive material can be included in the negative electrode such that the battery can be fully charged even though this lost capacity is not accessible during most of the life of the battery. Due to the inclusion of additional negative electrode active material to compensate for the irreversible capacity loss, negative electrode material is essentially wasted. The irreversible capacity lose generally can be attributed to changes during the initial charge-discharge cycle of the battery materials that are substantially maintained during subsequent cycling of the battery. Some of these irreversible capacity losses can be attributed to the positive electrode active materials, and the coated materials described herein result in a decrease in the irreversible capacity loss of the batteries.

Appropriate coating materials can both improve the long term cycling performance of the material as well as decrease the first cycle irreversible capacity loss. While not wanting to be limited by theory, the coatings may stabilize the crystal lattice of the positive electrode active material during the uptake and release of lithium ions so that irreversible changes in the crystal lattice are reduced significantly. In particular, metal fluoride compositions can be used as effective coatings. The general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference.

It has been discovered that metal fluoride coatings can provide significant improvements for lithium rich layered positive electrode active materials. In particular, $AlF_3$ can be a desirable coating material due to reasonable cost of the materials and the relatively low environmental concerns associated with aluminum ions, although other metals fluorides also are suitable. The performance improvements associated with the coating materials can relate to long term cycling with significantly reduced degradation of capacity, a significant decrease in first cycle irreversible capacity loss and an improvement in the capacity generally. Since the coating materials are believed to be inactive in the cell cycling, it is surprising that the coating materials can increase the active materials specific capacities. The amount of coating material can be selected to accentuate the observed performance improvements. The improvements lithium rich positive electrode active materials are described further in the '735 application and the '814 application.

The materials described herein also exhibit a large tap density. In general, when specific capacities are comparable, a larger tap density of a positive electrode material results in a higher overall capacity of a battery. The large tap density of the active material also can result in a battery with a greater specific energy and specific power. Generally, a battery with a greater capacity can provide for longer discharge times for a specific application. Thus, these batteries can exhibit a meaningfully improved performance. It is useful to note that during charge/discharge measurements, the specific capacity of a material depends on the rate of discharge. The greatest specific capacity of a particular material is measured at very slow discharge rates. In actual use, the actual specific capacity is less than the maximum value due to discharge at a faster rate. More realistic specific capacities can be measured using reasonable rates of discharge that are more similar to the rates encountered during actual use. For low to moderate rate applications, a reasonable testing rate involves a discharge of the battery over three hours. In conventional notation this is written as C/3 or 0.33 C. Faster or slower discharge rates can be used as desired.

In general, the improvements in the battery performance properties do not all correlate with the same coating thickness. These properties are studied in more detail below and corresponding results are presented in the Examples. In summary, the decrease in irreversible capacity loss plateaus at roughly 10 nanometers (nm) of coating thickness. With respect to average voltage, the coating tends to decrease the average voltage, but the average voltage is not significantly decreased with thinner coatings. With respect to the specific capacity, the specific capacity first increases and then decreases as the coating thickness increases. And the specific capacity results change with cycling and the rate of the discharge.

A set of results are presented in the Examples below that provide information useful for evaluating appropriate coating thicknesses for desirable battery performance for high voltage batteries with reasonable long term cycling properties. It is found that thicker metal fluoride coatings with a thickness of roughly 20 nm or greater have a significant reduction in irreversible capacity loss. Materials with these thick coatings also exhibit good cycling over 34 charge-discharge cycles at a C/3 rate. However, these materials exhibit a significant drop in the average voltage. These materials with thicker coatings also exhibit reduced specific capacities relative to thinner coatings. The drop in specific capacity for the materials with the thicker coating is more pronounced at higher rates, which might suggest that thicker coatings impede the movement of lithium ions past the thicker coating.

At moderate metal fluoride coating thicknesses between about 8 nm and about 20 nm, the materials exhibit most of the decrease with respect to irreversible capacity loss as observed with materials with greater coating thicknesses. Furthermore, the average voltages are greater than obtained with thicker coatings. In addition, the specific capacity of these materials is similarly greater than for the same active composition with a greater coating thickness. However, the positive electrode active materials with intermediate coating thicknesses can have significantly poorer coulombic efficiency relative to materials with a greater coating thickness. In other words, the specific capacity of the materials with the greater coating thickness fades more quickly with cycling. Thus, if the results are extrapolated to a greater number of cycles, the positive electrode active materials with intermediate thickness metal fluoride coatings would be expected to undesirably poor cycling properties in most applications.

Surprisingly, the positive electrode active materials with thinner metal fluoride coatings display surprisingly desirable results. Thus, positive electrode active materials with a metal fluoride coating having a coating thickness from about 0.5 nm to about 12 nm have desirable and surprisingly good properties when incorporated into batteries. These, materials exhibit less of a decrease in irreversible capacity loss. But irreversible capacity loss is not the most significant property of the materials in the context of longer term cycling. The positive electrode active materials with a thinner metal fluoride coating have a greater average voltage, which can be comparable to the average voltage of the uncoated material. These materials can have high initial specific capacities, and the materials can exhibit a desirable coulombic efficiency such that the fade with cycling is low at moderate rates out to at least 40 cycles.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. Most of the batteries used in these electronic devices have a fixed volume. It is therefore highly desirable that the positive electrode material used in these batteries has a high tap density so there is essentially more chargeable material in the positive electrode yielding a higher total capacity of the battery. The batteries described herein that incorporate improved positive electrode active materials with respect to specific capacity, tap density, and cycling can provide improved performance for consumers, especially for medium current applications.

The batteries described herein are suitable for vehicle applications. In particular, these batteries can be used in battery packs for hybrid vehicles, plug-in hybrid vehicles and purely electric vehicles. These vehicles generally have a battery pack that is selected to balance weight, volume and capacity. While larger battery packs can provide a greater range on electric operation, larger packs take up more room that is then not available for other purposes and have greater weight that can decrease performance. Thus, due to the high capacity of the batteries described herein, a battery pack that yields a desired amount of total power can be made in a reasonable volume, and these battery packs can correspondingly achieve the excellent cycling performance described herein.

Battery Structure

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into the structure through intercalation, alloying or similar mechanisms. Desirable mixed metal oxides are described further herein to function as electroactive materials for positive electrodes in secondary lithium ion batteries. Lithium ion batteries refer to batteries in which the negative electrode active material is a material that takes up lithium during charging and releases lithium during discharging. If lithium metal itself is used as the anode, the resulting battery generally is simply referred to as a lithium battery.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, coke, fullerenes, niobium pentoxide, tin alloys, silicon, titanium oxide, tin oxide, and lithium titanium oxide, such as $Li_xTiO_2$, $0.5<x\leq1$ or $Li_{1+x}Ti_{2-x}O_4$, $0\leq x\leq 1/3$. Additional negative electrode materials are described in copending patent application Ser. No. 12/502,609 to Kumar, entitled "Composite Compositions, Negative Electrodes with Composite Compositions and Corresponding Batteries," and Ser. No. 12/429,438, now U.S. Pat. No. 8,277,974, to Kumar et al., entitled "Lithium Ion Batteries with Particular Negative Electrode Compositions," both of which are incorporated herein by reference.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. The particle loading in the binder can be large, such as greater than about 80 weight percent. To form the electrode, the powders can be blended with the polymer in a suitable liquid, such as a solvent for the polymer. The resulting paste can be pressed into the electrode structure. In some embodiments, the batteries can be constructed based on the method described in copending patent application Ser. No. 12/403,521, now U.S. Pat. No. 8,187,752, to Buckley et al, entitled "High Energy Lithium Ion Secondary Batteries", incorporated herein by reference.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure from about 2 to about 10 $kg/cm^2$ (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride, lithium difluoro oxalato borate, and combinations thereof. Traditionally, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof.

The electrodes described herein can be incorporated into various commercial battery designs. For example, the cathode compositions can be used for prismatic shaped batteries, wound cylindrical batteries, coin batteries or other reasonable battery shapes. The testing in the Examples is performed using coin cell batteries. The batteries can comprise a single cathode structure or a plurality of cathode structures assembled in parallel and/or series electrical connection(s). While the positive electrode active materials can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used.

Positive Electrode Active Materials

The positive electrode active materials comprise lithium intercalating metal oxide compositions. In some embodiments, the lithium metal oxide compositions can comprise lithium rich compositions relative to a reference composition. Generally, $LiMO_2$ can be considered the reference composition, and the lithium rich compositions can be referred to with an approximate formula $Li_{1+x}M_{1-y}O_2$, where M represents one or more metals and y is related to x based on the average valance of the metals. In some embodiments, the lithium rich compositions generally are believed to form a layered composite crystal structure, and for these embodiments x is approximately equal to y. In some embodiments, the compositions comprise Ni, Co and Mn ions optionally along with one or more additional metal ion dopants. It has been surprising found that the dopant improves the performance of the resulting compositions with respect to the capacity after cycling. Furthermore, for coated samples, the average voltage can be increased with doping and some decrease in the irreversible capacity loss has also been found. The desired electrode active materials can be synthesized using synthesis approaches described herein.

The lithium rich compositions $Li_{1+x}M_{1-y}O_2$ provide additional lithium which can be available to contribute to the battery capacity. With the extra lithium loaded into the negative electrode during charging, these batteries can operate at higher voltages. Thus, these materials provide a desirable high voltage material with higher specific capacities.

In some compositions of particular interest, the compositions can be described by the formula $Li_{1+x}Ni_\alpha Mn_\beta Co_\gamma A_\delta O_2$, where x ranges from about 0.01 to about 0.3, α ranges from about 0.1 to about 0.4, β ranges from about 0.3 to about 0.65, γ ranges from about 0 to about 0.4, δ ranges from about 0 (or 0.001 if not zero) to about 0.15, and where A is Mg, Sr, Ba, Cd, Zn, Al, Ga, B, Zr, Ti, Ca, Ce, Y, Nb, Cr, Fe, V, Li or combinations thereof. In some embodiments, the sum x+α+β+γ+δ of the positive electrode active material approximately equals 1.0. A, which is in small amounts, can be considered a dopant element. A person of ordinary skill in the art will recognize that additional ranges of parameter values within the explicit ranges above are contemplated and are within the present disclosure. Coatings for these materials are described further below.

With respect to some embodiments of materials described herein, Thackery and coworkers have proposed a composite crystal structure for some lithium rich metal oxide compositions in which a $Li_2M'O_3$ composition is structurally integrated into a layered structure with a $LiMO_2$ component. The electrode materials can be represented in two component notation as b $Li_2M'O_3 \cdot (1-b) LiMO_2$, where M is one or more metal elements with an average valance of +3 and with at least one element being Mn or Ni and M' is a metal element with an average valance of +4 and 0<b<1, and in some embodiments 0.03≤b≤0.9. For example, M can be a combination of $Ni^{+2}$, $Co^{+3}$ and $Mn^{+4}$. The overall formula for these compositions can be written as $Li_{1+b/(2+b)}M'_{2b/(2+b)}M_{2(1-b)/(2+b)}O_2$. This formula is consistent with the sum x+α+β+γ+δ equal to 1 in the formula of the previous paragraph where x=b/(2+b). Batteries formed from these materials have been observed to cycle at higher voltages and with higher capacities relative to batteries formed with corresponding $LiMO_2$ compositions. These materials are described generally in U.S. Pat. No. 6,680,143 to Thackery et al., entitled Lithium Metal Oxide Electrodes for Lithium Cells and Batteries," and U.S. Pat. No. 6,677,082 to Thackery et al., entitled "Lithium Metal Oxide Electrodes for Lithium Cells and Batteries," both of which are incorporated herein by reference. Thackery identified Mn, Ti and Zr as being of particular interest as M' and Mn and Ni for M.

The structure of some specific layered structures is described further in Thackery et al., "Comments on the structural complexity of lithium-rich $Li_{1+x}M_{1-x}O_2$ electrodes (M=Mn,Ni,Co) for lithium batteries," Electrochemistry Communications 8 (2006), 1531-1538, incorporated herein by reference. The study reported in this article reviewed compositions with the formulas $Li_{1+x}[Mn_{0.5}Ni_{0.5}]_{1-x}O_2$ and $Li_{1+x}[Mn_{0.333}Ni_{0.333}Co_{0.333}]_{1-x}O_2$. The article also describes the structural complexity of the layered materials.

Recently, Kang and coworkers described a composition for use in secondary batteries with the formula $Li_{1+x}Ni_\alpha Mn_\beta Co_\gamma M'_\delta O_{2-z}F_z$, M'=Mg, Zn, Al, Ga, B, Zr, Ti, x between about 0 and 0.3, α between about 0.2 and 0.6, β between about 0.2 and 0.6, γ between about 0 and 0.3, δ between about 0 and 0.15 and z between about 0 and 0.2. The metal ranges and fluorine were proposed as improving battery capacity and stability of the resulting layered structure during electrochemical cycling. See U.S. Pat. No. 7,205,072, to Kang et al. (the '072 patent), entitled "Layered cathode materials for lithium ion rechargeable batteries," incorporated herein by reference. This reference reported a cathode material with a capacity below 250 mAh/g (milliampere hours per gram) at room temperature after 10 cycles, which is at an unspecified rate that can be assumed to be low to increase the performance value. Kang et al. examined various specific compositions including $Li_{1.2}Ni_{0.15}Mn_{0.55}Co_{0.10}O_2$, which is similar to the composition examined in the examples below.

The results obtained in the '072 patent involved a solid state synthesis of the materials that did not achieve comparable cycling capacity of the batteries formed with cathode active materials formed with co-precipitation methods. The improved performance of the materials formed by co-precipitation is described further in the '814 application and '735 application noted above. The co-precipitation process for the doped materials described herein is described further below.

The performance of the positive electrode active materials is influenced by many factors. It has been found that a thin metal fluoride coating or other inorganic coating can notably improve many significant performance parameters. Also, the mean particle size and the particle size distribution are two of the basic properties characterizing the positive electrode active materials, and these properties influence the rate capabilities and tap densities of the materials. Because batteries have fixed volumes, it is therefore desirable that the material used in the positive electrode of these batteries has a high tap density if the specific capacity of the material can be maintained at a desirably high value. Then, the total capacity of the battery can be higher due to the presence of more chargeable material in the positive electrode. The coatings can be added while still obtaining good tap densities using the processes to form the materials described herein. In general, tap densities can be obtained of at least about 1.3 grams/milliliter (g/mL), in further embodiments at least about 1.6 g/mL and in some embodiments at least about 2.0 g/mL, where the tap density can be obtained using commercial tapping apparatuses using reasonable tapping parameters. A person of ordinary skill in the art will recognize that additional ranges of tap density within the specific ranges above are contemplated and are within the present disclosure.

Synthesis Methods

Synthesis approaches described herein can be used to form lithium rich cathode active materials with improved specific capacity upon cycling and a high tap density. The synthesis methods have been adapted for the synthesis of compositions with the formula $Li_{1+x}Ni_\alpha Mn_\beta Co_\gamma A_\delta O_2$, where x ranges from about 0.01 to about 0.3, α ranges from about 0.1 to about 0.4, β ranges from about 0.3 to about 0.65, γ ranges from about 0 to about 0.4, δ ranges from about 0 to about 0.1, and where A is Mg, Sr, Ba, Cd, Zn, Al, Ga, B, Zr, Ti, Ca, Ce, Y, Nb, Cr, Fe, V, Li or combinations thereof. In some embodiments, the sum x+α+β+γ+δ of the positive electrode active material approximately equals 1.0, and for these embodiments, a layered crystalline structure can form as described above. The synthesis approaches are also suitable for commercial scale up. Specifically, co-precipitation process can be used to synthesize the desired lithium rich positive electrode materials with desirable results. Additionally, a solution assisted precipitation method discussed in detail below can be used to coat the material with metal fluoride.

In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 9.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, LiOH, $Li_2CO_3$, or a combination thereof, can be mixed with the precipitated metal carbonate or metal hydroxide. The powder mixture is then advanced through the heating step(s) to form the oxide and then the crystalline final product material.

Further details of the hydroxide co-precipitation process are described in the '814 application referenced above. Further details of the carbonate co-precipitation process are described in the '735 application referenced above.

Coatings and Methods for Forming the Coatings

Inert inorganic coatings, such as metal fluoride coatings, have been found to significantly improve the performance of the lithium rich layered positive electrode active materials described herein. However, there are tradeoffs with respect to the resulting battery properties as a function of the coating thickness. As described herein the effects of the coating on battery performance is evaluated for a matrix of significant battery performance parameters. The evaluation of performance with the coating thickness yields relatively complex relationships. It has been surprisingly found that overall the best performance improvements results from thin coatings, no more than about 8 nm thick. The improvement in battery properties is described in detail in the following section.

The coating can provide improvements in the performance of the high capacity lithium rich compositions described herein in lithium ion secondary batteries. In general, a selected metal fluoride or metalloid fluoride can be used for the coating. Similarly, a fluoride coating with a combination of metal and/or metalloid elements can be used. Metal/metalloid fluoride coatings have been proposed to stabilize the performance of positive electrode active materials for lithium secondary batteries. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. The metal fluoride coating are described generally in published PCT application WO 2006/109930A to Sun et al., entitled "Cathode Active Materials Coated with Fluorine Compound for Lithium Secondary Batteries and Method for Preparing the Same," incorporated herein by reference. This published patent application provides results for $LiCoO_2$ coated with $LiF$, $ZnF_2$ or $AlF_3$. The Sun PCT application referenced above specifically refers to the following fluoride compositions, CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

The effect of an $AlF_3$ coating on the cycling performance of $LiNi_{1/3}Co_{1/3}Mn_{1/3}O_2$ is described further in an article to Sun et al., "$AlF_3$-Coating to Improve High Voltage Cycling Performance of $Li[Ni_{1/3}Co_{1/3}Mn_{1/3}]O_2$ Cathode Materials for Lithium Secondary Batteries," J. of the Electrochemical Society, 154 (3), A168-A172 (2007). Also, the effect of an $AlF_3$ coating on the cycling performance of $LiNi_{0.8}Co_{0.1}Mn_{0.1}O_2$ is described further in an article to Woo et al., "Significant Improvement of Electrochemical Performance of $AlF_3$-Coated $Li[Ni_{0.8}Co_{0.1}Mn_{0.1}]O_2$ Cathode Materials," J. of the Electrochemical Society, 154 (11) A1005-A1009 (2007), incorporated herein by reference. An increase in capacity and a reduction in irreversible capacity loss were noted with $Al_2O_3$ coatings by Wu et al., "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference. Improved metal oxide coatings are described in copending U.S. provisional patent application Ser. No. 61/253,286 to Venkatachalam et al., entitled "Metal Oxide Coated Positive Electrode Materials for Lithium Ion Batteries," incorporated herein by reference. The use of a $LiNiPO_4$ coating to obtain improved cycling performance is described in an article to Kang et al. "Enhancing the rate capability of high capacity $xLi_2MnO_3 \cdot (1-x)LiMO_2$ (M=Mn, Ni, Co) electrodes by Li—Ni—$PO_4$ treatment," Electrochemistry Communications 11, 748-751 (2009), incorporated herein by reference.

It has been found that metal/metalloid fluoride coatings can significantly improve the performance of lithium rich layered compositions for lithium ion secondary batteries. See, for example, the '814 application and the '735 application cited above. In particular, the coating can improve the capacity of the batteries. However, the coating itself is not electrochemically active. When the loss of specific capacity due to the amount of coating added to a sample exceeds where the benefit of adding coating is offset by its electrochemical inactivity, reduction in battery capacity can be expected. In general, the amount of coating can be selected to balance the beneficial stabilization resulting from the coating with the loss of specific capacity due to the weight of the coating material that generally does not contribute directly to a high specific capacity of the material.

However, the battery properties as a function of coating thickness have been found to be complex. In particular, the coatings also influence other properties of the active material, such as the average voltage, irreversible capacity loss, coulombic efficiency and impedance. The selection of a desired coating thickness can be based on an evaluation of the overall range of battery properties that are observed for particular coating thicknesses. In general, the coating can have a thickness from about 0.05 nm to about 50 nm. However, as described further below, it has been surprisingly found that thinner coatings can provide the best overall performance parameters for secondary lithium ion batteries that are cycled extensively. In some embodiments of particular interest, the coatings have an average thickness form about 0.5 nm to about 12 nm, in other embodiments from about 1 nm to about 10 nm, in further embodiments from 1.25 nm to about 9 nm and in additional embodiments from about 1.5 nm to about 8 nm. A person of ordinary skill in the art will recognize that additional ranges of coating material within the explicit ranges above are contemplated and are within the present disclosure. The amount of $AlF_3$ effective in $AlF_3$ coated metal oxide materials to improve the capacity of the uncoated material is related to the particle size and surface area of the uncoated material. In general, the amount of coating material ranges from about 0.01 mole percent to about 10 mole percent, in further embodiments from about 0.05 mole percent to about 7 mole percent, in additional embodiments from about 0.1 mole percent to about 5 mole percent, and in other embodiments from about 0.2 mole percent to about 4 mole percent relative to the total metal content of the particles. A person of ordinary skill in the art will recognize that additional ranges of coating material within the explicit ranges above are contemplated and are within the present disclosure.

The fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired amount of coating, and the ratio of coating reactants can be based on the stoichiometry of the coating material. In particular, the desired thickness of coating can be formed through the addition of an appropriate amount of coating reactants. The selection of the amount of coating material can be verified through an examination of the product particles using electron microscopy as described below in the Examples. The coating mixture can be heated during the coating process to reasonable temperatures, such as in the range from about 60° C. to about 100° C. for aqueous solutions for from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere. Specific procedures for the formation of $AlF_3$, $MgF_2$, $CaF_2$, $SrF_2$ and $BaF_2$ coatings are described in the examples below. The formation of inert metal oxide coatings, such as $Al_2O_2$, and $Li-Ni-PO_4$ coatings are described in the articles cited above.

Battery Performance

Batteries formed from the coated positive electrode active materials described herein have demonstrated superior performance under realistic discharge conditions for moderate current applications. Specifically, the active materials have demonstrated a high specific capacity upon cycling of the batteries at moderate discharge rates. Furthermore, some coated positive electrode active materials have demonstrated improved cycling out to a large number of cycles. It has surprisingly been found that a thinner coating provides an overall more desirable performance profile than batteries formed with positive electrode active materials with a thicker coating. In particular, thinner coatings have improved cycling and a greater average discharge voltage. While active materials with thinner coatings result in batteries with less of a decrease in irreversible capacity loss, the thin coatings can be used to form batteries with some decrease in irreversible capacity loss, and the other improved properties of the batteries formed with the materials with the thinner coatings are more significant than the differences with respect to the irreversible capacity loss. Thus, coatings having an average thickness from about 0.5 to about 8 nm have been found in particular to provide the desired balance to obtain excellent performance characteristics.

As noted above, the irreversible capacity loss is the difference between the first charge specific capacity and the first discharge specific capacity. With respect to the values described herein, the irreversible capacity loss is in the context of the positive electrode active materials, which is evaluated relative to a lithium metal negative electrode. It is desirable to reduce the irreversible capacity loss so that additional negative electrode active material is not needed to balance the positive electrode active material that ultimately does not cycle. In some embodiments, the irreversible capacity loss is no more than about 60 mAh/g, in further embodiments no more than about 55 mAh/g, and in other embodiments from about 30 mAh/g to about 50 mAh/g. With respect to balancing of various battery parameters, the irreversible capacity loss can be between about 40 mAh/g to about 60 mAh/g. Similarly, in some embodiments, the irreversible capacity loss is not more than about 19% and in further embodiments no more than about 18% of the first cycle specific charge capacity. A person of ordinary skill in the art will recognize that additional ranges of irreversible capacity loss are contemplated and are within the present disclosure.

Average voltage may be an important parameter for batteries for certain applications. The average voltage can relate to the available capacity above a certain voltage. Therefore, in addition to having a high specific capacity it is desirable for a positive electrode active material to also cycle with a high average voltage. For the materials described herein that are cycled between 4.6V and 2.0V, an average voltage can be at least about 3.475V, in further embodiments at least about 3.5V, in additional embodiments at least about 3.525V and in other embodiments from about 3.55V to about 3.65V. A person of ordinary skill in the art will recognize that additional ranges of average voltage within the explicit ranges above are contemplates and are within the present disclosure.

In general, various similar testing procedures can be used to evaluate the capacity performance of the battery positive electrode materials. Some specific testing procedures are described for the evaluation of the performance values described herein. Suitable testing procedures are described in more detail in the examples below. Specifically, the battery can be cycled between 4.6 volts and 2.0 volts at room temperature, although other ranges can be used with correspondingly different results. Also, the specific capacity is very dependent on the discharge rate. Again, the notation C/x implies that the battery is discharged at a rate to fully discharge the battery to the selected voltage minimum in x hours.

In some embodiments, the positive electrode active material has a specific capacity during the tenth cycle at a discharge rate of C/3 of at least about 245 milliamp hours per gram (mAh/g), in additional embodiments at least about 250 mAh/g, and in further embodiments from about 255 mAh/g to about 265 mAh/g. Additionally, the $40^{th}$ cycle discharge capacity of the material is at least about 94%, and in further embodiments at least about 95% of the $7^{th}$ cycle discharge capacity, cycled at a discharge rate of C/3. The maintenance of the specific capacity at 40 cycles relative to the specific capacity at the 7th cycle can also be referred to as the coulombic efficiency, as described further in the examples. Also, the coated materials can exhibit surprisingly good rate capability. Specifically, the materials can have a specific discharge of at least about 190 mAh/g, in further embodiments at least about 195 mAh/g and in additional embodiments at least about 200 mAh/g at a rate of 2 C discharged from 4.6V to 2.0V at room temperature at the 15th charge/ discharge cycle. A person of ordinary skill in the art will recognize that additional ranges of specific capacity are contemplated and are within the present disclosure.

In general, the results herein suggest a balance of factors that result in particularly desirable battery performance for a thin coating over the active material for the positive electrode. The results in the example suggest that thicker coatings may result in a greater impedance that may contribute to the capacity and voltage performances observed. With an appropriate thin coating, excellent specific capacities, coulombic efficiency and average voltages can be obtained.

EXAMPLES

The Examples include data obtained using coin cells as well as additional data with cylindrical cells. The formation of the coin cells with a lithium foil negative electrode is summarized in this introduction, and the formation of the coin cells with carbon based electrodes is described in Example 5 below. The coin cell batteries tested in Examples 1, 3 and 4 were produced following a procedure outlined here. The lithium metal oxide (LMO) powders were mixed thoroughly with acetylene black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone NMP (Honeywell—Riedel-de-Haen) and stirred overnight to form a PVDF-NMP solution. The homogeneous powder mixture was then added to the PVDF-NMP solution and mixed for about 2 hours to form a homogeneous slurry. The slurry was applied onto an aluminum foil current collector to form a thin wet film.

A positive electrode material was formed by drying the aluminum foil current collector with the thin wet film in vacuum oven at 110° C. for about two hours to remove NMP. The positive electrode material was pressed between rollers of a sheet mill to obtain a positive electrode with desired thickness. An example of a positive electrode composition developed using above process having a LMO:acetylene black:graphite:PVDF ratio of 80:5:5:10 is presented below.

The positive electrode was placed inside an argon filled glove box for the fabrication of the coin cell batteries. Lithium foil (FMC Lithium) having thickness of 150 micron was used as a negative electrode. The electrolyte was a 1 M solution of $LiPF_6$ formed by dissolving $LiPF_6$ salt in a mixture of ethylene carbonate, diethyl carbonate and dimethyl carbonate (from Ferro Corp., Ohio USA) at a 1:1:1 volumetric ratio. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles. All the electrochemical data contained herein have been cycling at three rates, 0.1 C (C/10) for the first three cycles, 0.2 C (C/5) for cycles 4-6 or 0.33 C (C/3) for cycles 7 and on.

Example 1—Reaction of Metal Sulfate with $Na_2CO_3/NH_4OH$ for Carbonate Co-Precipitation This example demonstrates the formation of a desired cathode active material using a carbonate co-precipitation process. Stoichiometric amounts of metal sulfates ($NiSO_4 \cdot xH_2O$, $CoSO_4 \cdot xH_2O$, & $MnSO_4 \cdot xH_2O$) were dissolved in distilled water to form a metal sulfate aqueous solution. Separately, an aqueous solution containing $Na_2CO_3$ and $NH_4OH$ was prepared. For the formation of the samples, the two solutions were gradually added to a reaction vessel to form metal carbonate precipitates. The reaction mixture was stirred, and the temperature of the reaction mixture was kept at a temperature between room temperature and 80° C. for 2-24 hours. The pH of the reaction mixture was in the range from 6-9. In general, the aqueous metal sulfate solution had a concentration from 1M to 3M, and the aqueous $Na_2CO_3/NH_4OH$ solution had a $Na_2CO_3$ concentration of 1M to 4M and a $NH_4OH$ concentration of 0.2-2M. The metal carbonate precipitate was filtered, washed multiple times with distilled water, and dried at 110° C. for about 16 hrs to form a metal carbonate powder. Specific ranges of reaction conditions for the preparation of the samples are further outlined in Table 1.

TABLE 1

| Reaction Process Condition | Values |
| --- | --- |
| Reaction pH | 6.0-9.0 |
| Reaction time | 2-24 hr |
| Reactor type | Batch |
| Reactor agitation speed | 200-1400 rpm |
| Reaction temperature | RT - 80° C. |
| Concentration of the metal salts | 1-3M |
| Concentration of $Na_2CO_3$ (precipitating agent) | 1-4M |
| Concentration of $NH_4OH$ (chelating agent) | 0.2-2M |
| Flow rate of the metal salts | 1-100 mL/min |
| Flow rate of $Na_2CO_3$ & $NH_4OH$ | 1-100 mL/min |

An appropriate amount of $Li_2CO_3$ powder was combined with the dried metal carbonate powder and thoroughly mixed by a Jar Mill, double planetary mixer, or dry powder rotary mixer to form a homogenous powder mixture. A portion, e.g. 5 grams, of the homogenized powders is calcined followed by an additional mixing step to further homogenize the powder formed. The further homogenized powder was again calcined to form the lithium composite oxide. The product composition was determined to be $Li_{1.2}Ni_{0.175}Co_{0.10}Mn_{0.525}O_2$. Specific ranges of calcination conditions are further outlined in Table 2.

TABLE 2

| | Calcination Process Condition | Values |
| --- | --- | --- |
| 1st Step | temperature | 400-800° C. |
| | time | 1-24 hr |
| | protective gas | Nitrogen or Air |
| | Flow rate of protective gas | 0-50 scfh |
| 2nd Step | temperature | 700-1100° C. |
| | time | 1-36 hr |
| | protective gas | Nitrogen or Air |
| | Flow rate of protective gas | 0-50 scfh |

Figure 2:
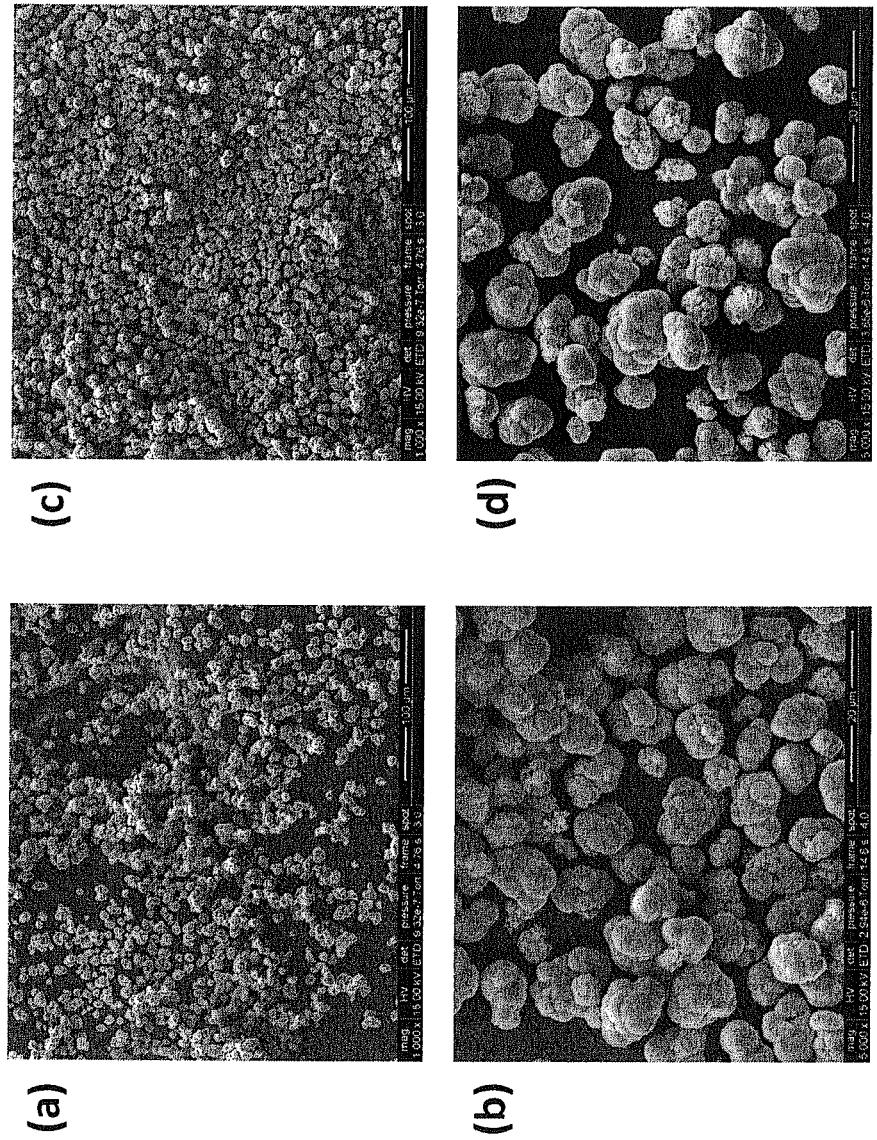
FIG. 2 is a set of SEM micrographs of uncoated high capacity cathode lithium oxide material at (a) 100 micron and (b) 20 micron resolution respectively relative to a reference bar as shown in the distance scale legend, and AlF$_3$ coated high capacity cathode lithium metal oxide material at (c) 100 micron and (d) 20 micron resolution respectively relative to a reference bar as shown in the distance scale legend.
Figure 3:
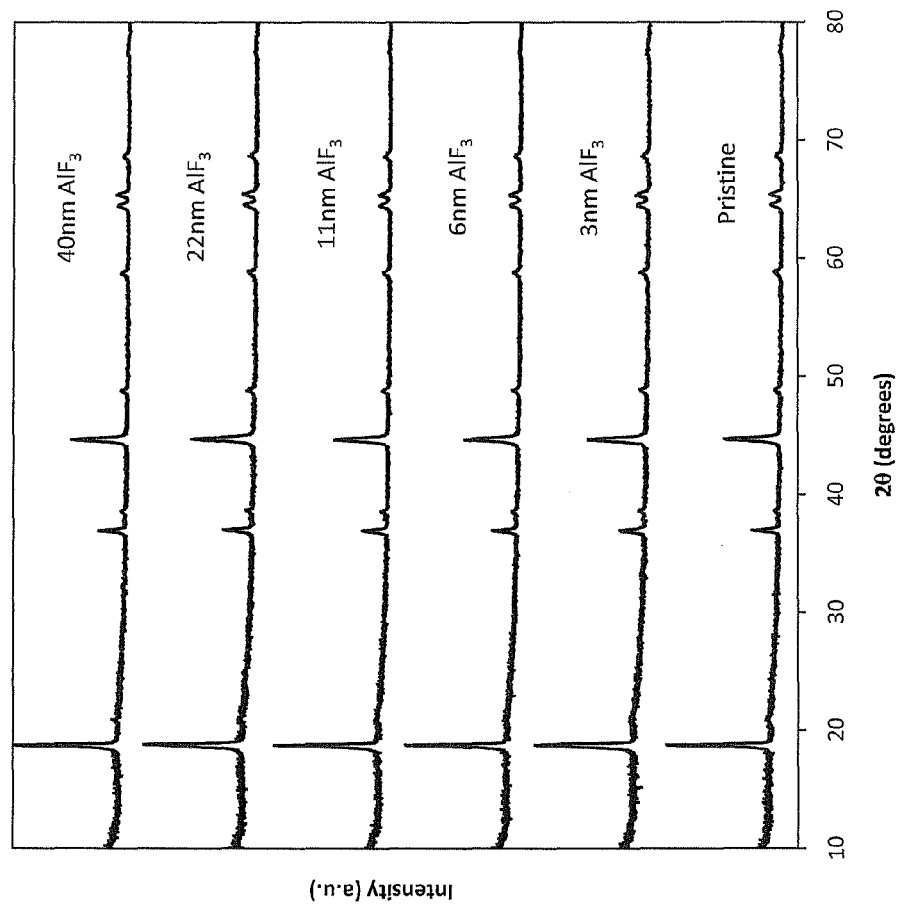
FIG. 3 is a plot of an X-ray diffraction spectrum of uncoated (pristine) high capacity cathode lithium metal oxide material sample and samples coated with varying thickness of AlF$_3$.

Scanning electron microscope (SEM) micrograms at different magnifications of the lithium composite oxides are shown in FIG. 2a and FIG. 2b, indicating the particles formed have a substantially spherical shape and are relatively homogenous in size. The x-ray diffraction pattern of the pristine composite powder is shown in FIG. 3, showing characteristics of a rock-salt type structure.

The composite was used to form a coin cell battery following the procedure outlined above. The coin cell battery was tested and the plot of voltage versus specific capacity at discharge rate of 0.1 C for the first cycle and 0.33

Figure 4:
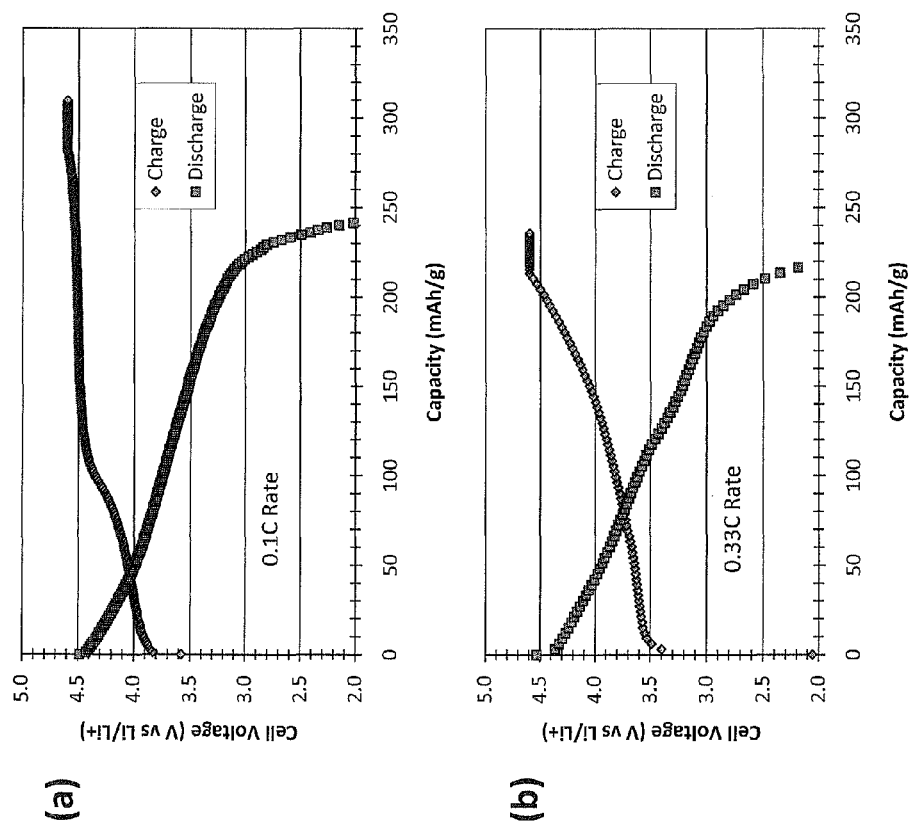
FIG. 4 is a set of two plots of cell voltage versus specific capacities of a uncoated high specific capacity cathode lithium metal oxide material cycled in the voltage range of 2.0 V-4.6 V at a charge/discharge rate of (a) 0.1 C for the 1st cycle and (b) ⅓ C for the seventh cycle.
Figure 5:
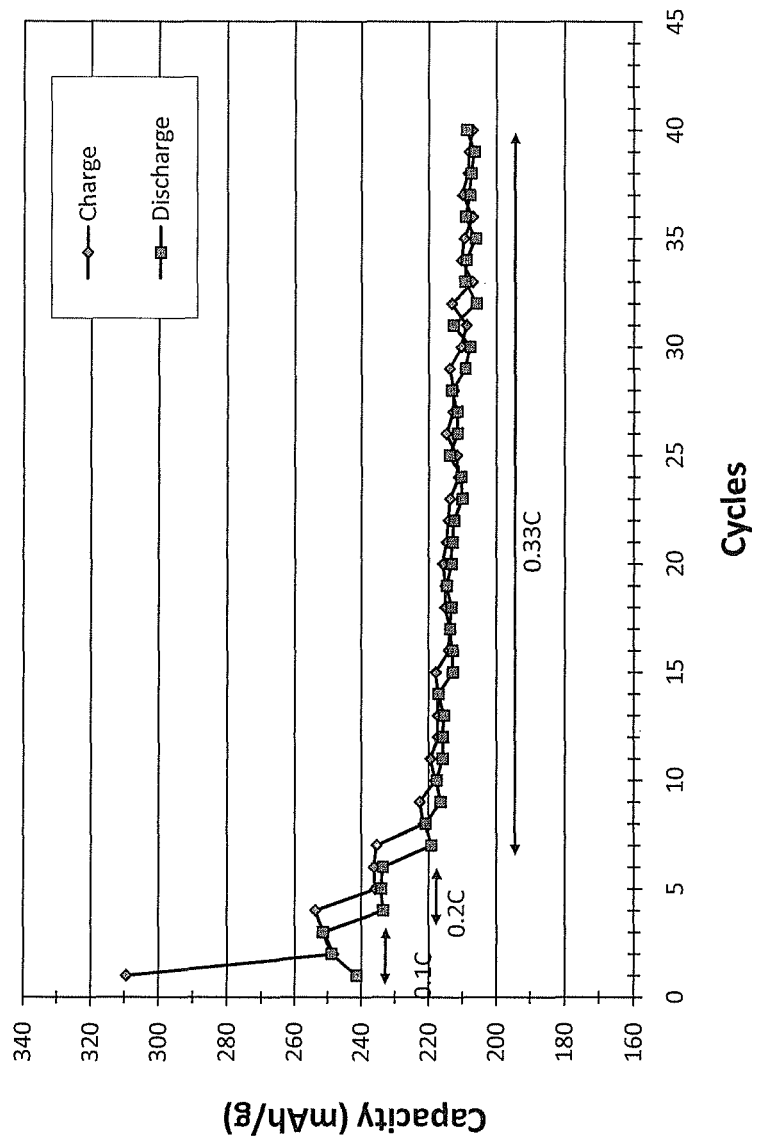
FIG. 5 is a plot of specific discharge capacity versus cycle number of an uncoated high capacity cathode lithium metal oxide material cycled at 0.1 C for the first three cycles, 0.2 C for cycle numbers 4-6 and 0.33 C for cycle numbers 7-40.

C for the 7th cycle are shown in FIG. 4(a) & (b), respectively. The first cycle specific capacity of the battery at 0.1 C discharge rate is about 245 mAh/g. The 7th cycle specific capacity of the battery at 0.33 C discharge rate is about 220 mAh/g. Specific capacity versus cycle life of the coin cell battery is also tested and the results are shown in FIG. 5. The first three cycles were measured at a discharge rate of 0.1 C. The next three cycles were measured at a rate of 0.2 C. The subsequent cycles were measured at a rate of 0.33 C. The battery maintained more than 90% specific capacity relative to cycle 7 after going through 40 charge and discharge cycles.

Example 2—Formation of $AlF_3$ Coated Metal Oxide Materials

The metal oxide particles prepared in the above example were coated with a thin layer of aluminum fluoride ($AlF_3$) using a solution-based method. For a selected amount of aluminum fluoride coating, an appropriate amount of saturated solution of aluminum nitrate was prepared in an aqueous solvent. The metal oxide particles were then added into the aluminum nitrate solution to form a mixture. The mixture was mixed vigorously for a period of time to homogenize. The length of mixing depends on the volume of the mixture. After homogenization, a stoichiometric amount of ammonium fluoride was added to the homogenized mixture to form aluminum fluoride precipitate while retaining the source of fluorine. Upon the completion of the precipitation, the mixture was stirred at 80° C. for 5 h. The mixture was then filtered and the solid obtained was washed repeatedly to remove any un-reacted materials. The solid was calcined in nitrogen atmosphere at 400° C. for 5 h to form the $AlF_3$ coated metal oxide material. SEM micrograms at different magnifications of representative $AlF_3$ coated lithium composite oxide are shown in FIG. 2c and FIG. 2d, indicating the particles formed have a substantially spherical shape and are relatively homogenous in size.

Figure 6:
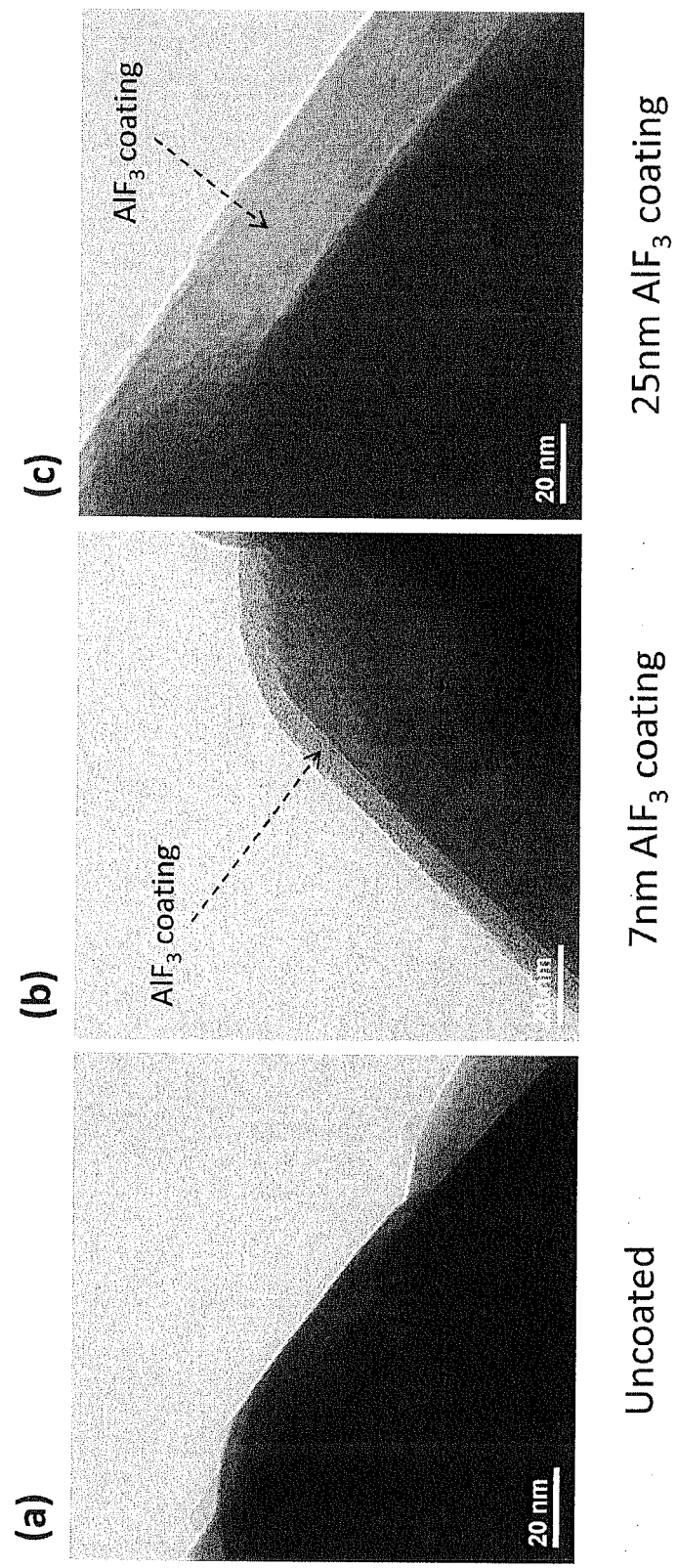
FIG. 6 is a set of TEM micrographs of (a) uncoated, (b) 7 nm AlF$_3$ coated, and (c) 25 nm AlF$_3$ coated high specific capacity cathode lithium metal oxide materials.

Samples of lithium metal oxide (LMO) particles synthesized as described in example 1 were coated with various selected amounts of aluminum fluoride using the process described in this example. Transmission electron microscopy was used to assess the thickness of the resulting $AlF_3$ coatings. For instance, FIG. 6a shows a transmission electron micrograph (TEM) of an uncoated lithium composite oxide particle, FIG. 6b shows a TEM micrograph of a LMO particle with an approximately 7 nm thick $AlF_3$ coating, and FIG. 6c shows a TEM micrograph of a LMO particle with an approximately 25 nm $AlF_3$ coating. The coatings were approximately constant thickness over the particle surfaces. The x-ray diffraction pattern of the aluminum fluoride coated LMO samples with coating thickness of 3 nm, 6 nm, 11 nm, 22 nm, and 40 nm are shown in FIG. 3 along with the diffractogram for the pristine, i.e., uncoated, sample. All of the x-ray diffractograms exhibit characteristics of a rock-salt type structure as the uncoated LMO sample. The aluminum fluoride coated LMOs were then used to form coin cell batteries following the procedure outlined above. The coin cell batteries were tested as described in the following Example.

Figure 7:
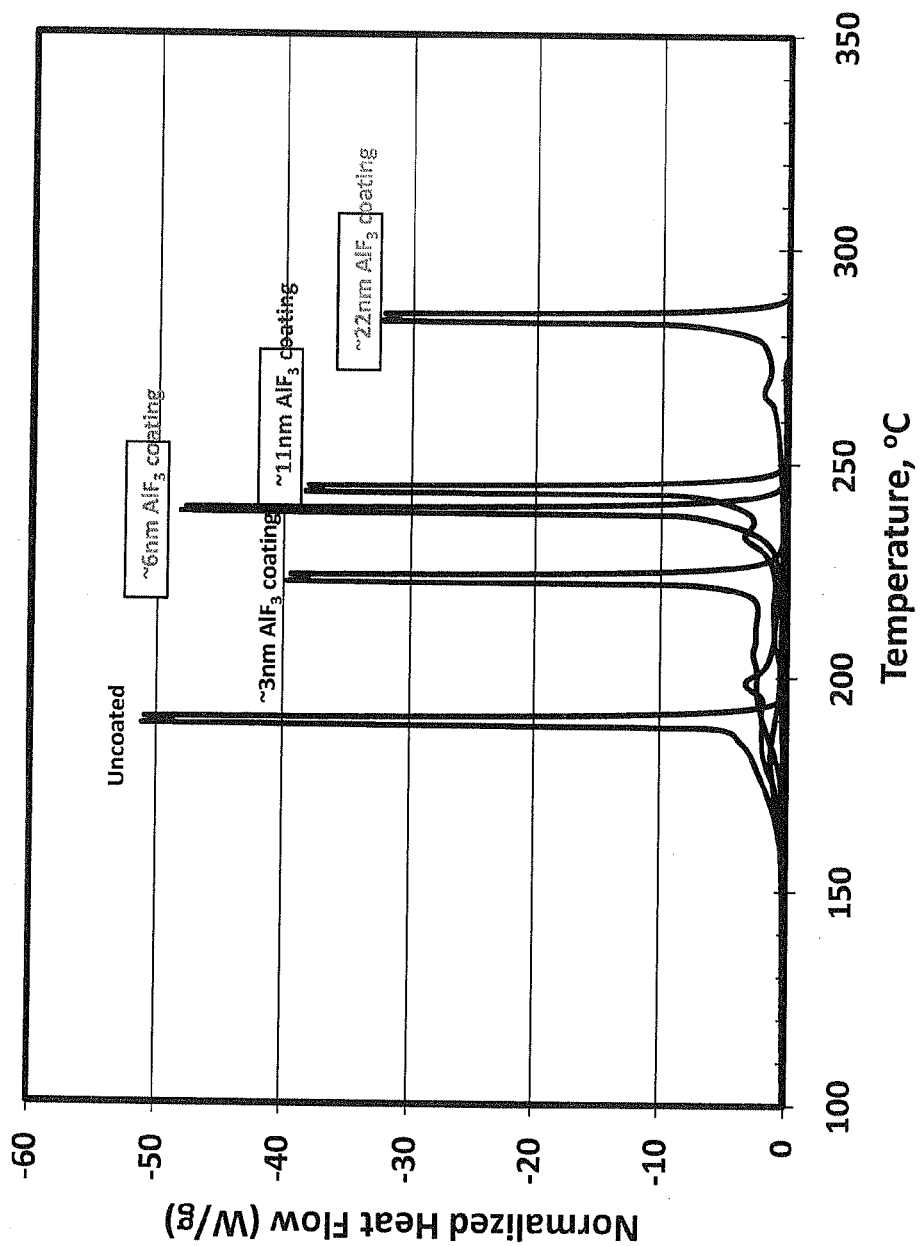
FIG. 7 is a plot of differential scanning calorimetry data for uncoated and four coated samples for the high capacity positive electrode active materials.

The stability of the cathode active materials was studied using differential scanning calorimetry (DSC). The DSC results are shown in FIG. 7 for uncoated LMO particles and particles with 4 different coating thicknesses. Peaks in the heat flow as a function of temperature indicate a phase transition or similar change of the material. From FIG. 4, it can be seen that all of the coating thicknesses stabilize the material relative to the low temperature active phase, although greater coating thicknesses further increased the stability. Therefore, it is expected that batteries formed with the materials should exhibit greater temperature stability at higher temperatures if coated LMO materials are used in the positive electrodes.

Example 3—Battery Performance for $AlF_3$ Coated Samples

This example demonstrates how the battery performance varied with respect to coating thickness for a range of $AlF_3$ coating thicknesses and for various battery performance parameters.

Figure 8:
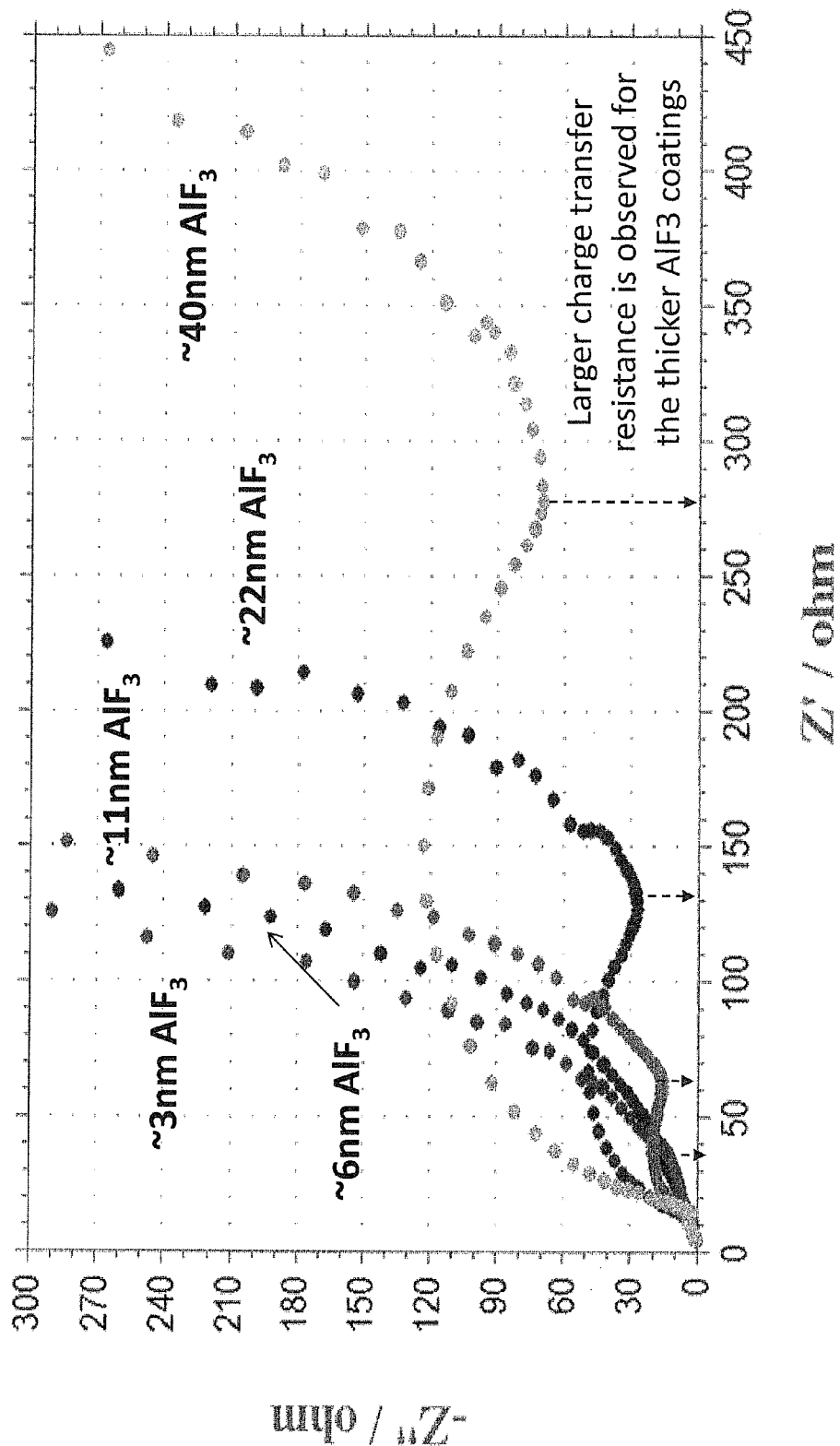
FIG. 8 is a plot of electrochemistry impedance spectroscopy results for electrodes formed with the positive electrode active materials for 5 coated material samples.

The impedance of the positive electrodes was examined using electrochemical impedance spectroscopy (EIS). This data provides information on the interfacial characteristics of the coated materials. The electrode is perturbed with a current in the form of a sinusoidal wave. A plot of the EIS results is presented in FIG. 8. These results show that a greater charge transfer resistance results form thicker $AlF_3$ coatings.

Coin cell batteries were formed from the materials synthesized as described in Example 2 using the process and coin cell structure described above. The cells were cycled to evaluate their performance. The first three cycles were measured at a charge/discharge rate of 0.1 C. The next three cycles were measured at a charge/discharge rate of 0.2 C. The subsequent cycles were measured at a charge/discharge rate of 0.33 C.

Figure 9:
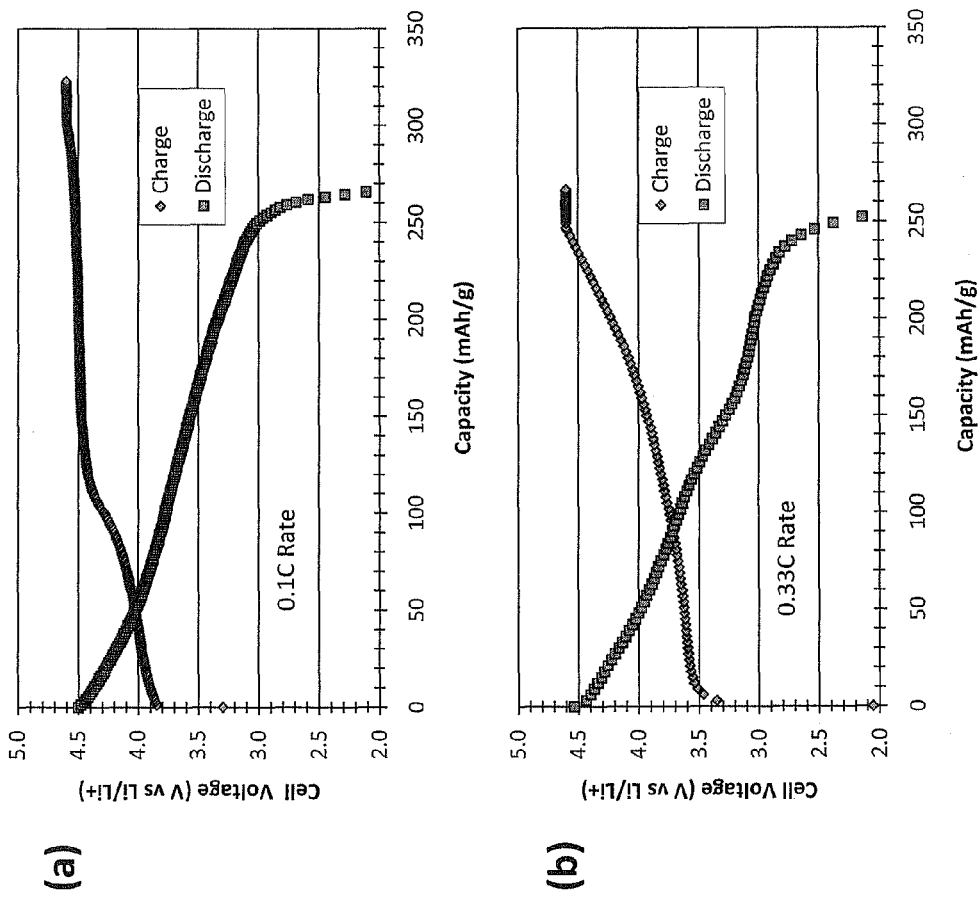
FIG. 9 is a set of two plots of cell voltage versus specific discharge capacities of a 3 nm AlF$_3$ coated high capacity cathode lithium metal oxide material cycled in the voltage range of 2.0 V-4.6 V at a charge/discharge rate of (a) 0.1 C for the first cycle and (b) ⅓ C for the 7th cycle.
Figure 10:
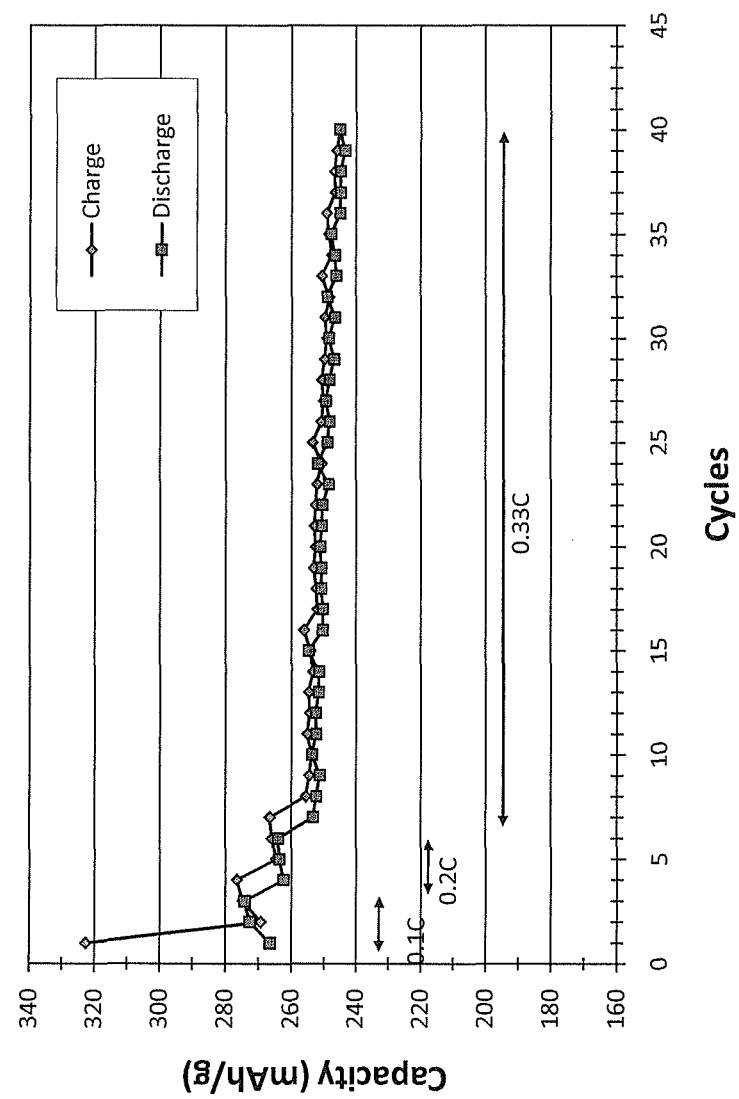
FIG. 10 is a plot of specific discharge capacity versus cycle number of a 3 nm AlF$_3$ coated high specific capacity cathode lithium metal oxide material cycled at 0.1 C for the first three cycles, 0.2 C for cycle numbers 4-6 and 0.33 C for cycle numbers 7-40.

Plots of voltage versus specific capacity of the coin cell battery formed from 3 nm aluminum fluoride coated LMO material are shown in FIG. 9(a) for the first cycle at a charge/discharge rate of 0.1 C and FIG. 9(b) for the 7th cycle at a charge/discharge rate of 0.33 C. The first cycle specific capacity of the battery at 0.1 C discharge rate was about 265 mAh/g. The first cycle specific capacity of the battery at 0.33 C discharge rate is about 250 mAh/g. Specific capacity versus cycle of the coin cell battery was also tested and the results are shown in FIG. 10. The positive electrode active material of the battery maintained more than 95% of its specific capacity relative to the specific capacity at cycle 7, the first C/3 cycle, after going through 40 charge and discharge cycles.

Figure 11:
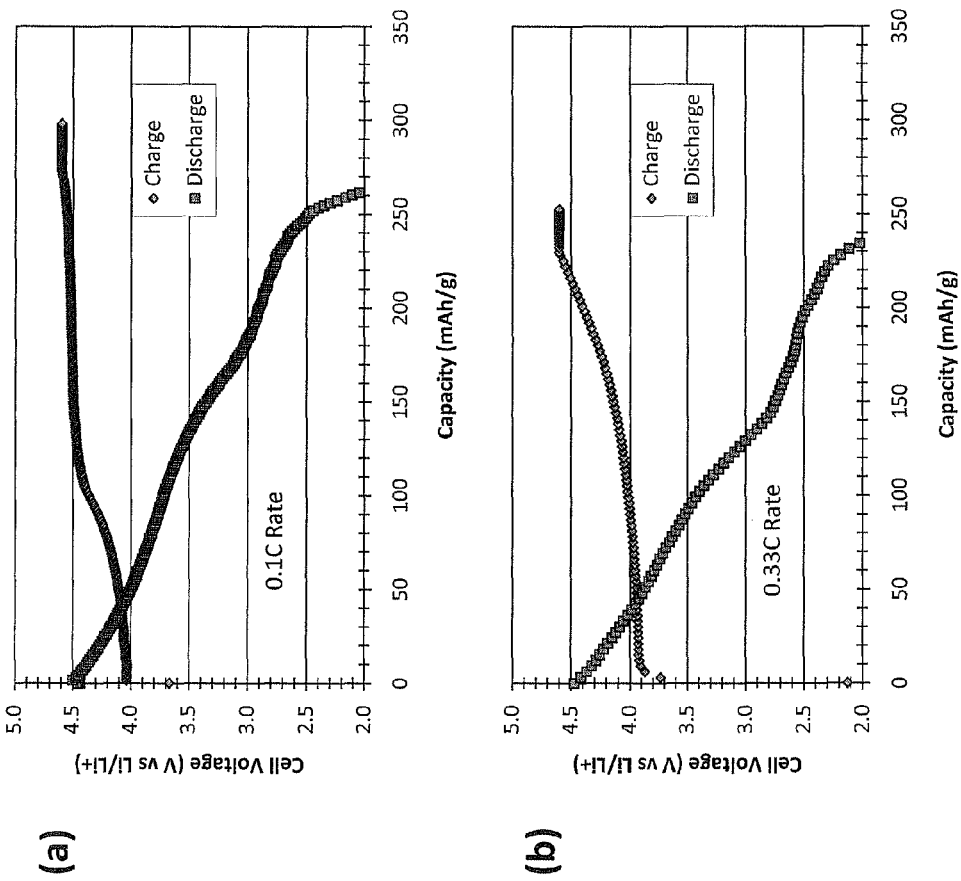
FIG. 11 is a set of two plots of cell voltage versus specific discharge capacities of a 22 nm AlF$_3$ coated high specific capacity cathode lithium metal oxide material cycled in the voltage range of 2.0 V-4.6 V at a discharge rate of (a) 0.1 C for the 1st cycle and (b) ⅓ C for the 7th cycle.
Figure 12:
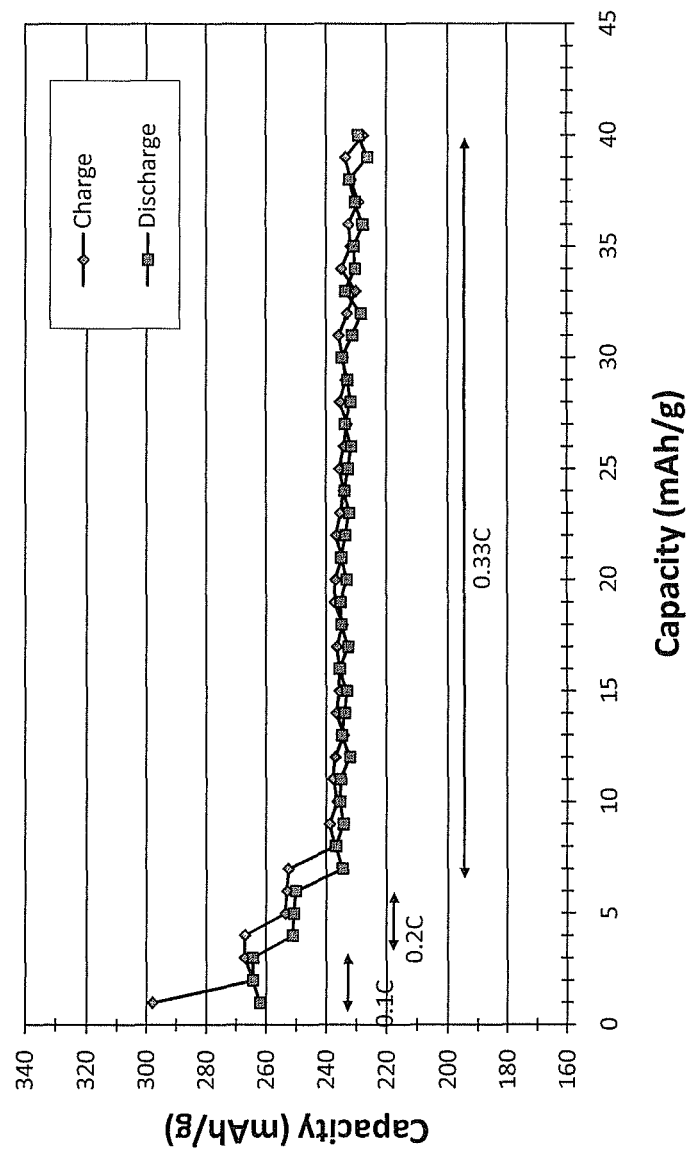
FIG. 12 is a plot of specific discharge capacity versus cycle number of a 22 nm $AlF_3$ coated high specific capacity cathode lithium metal oxide material cycled at 0.1 C for the first three cycles, 0.2 C for cycle numbers 4-6 and 0.33 C for cycle number 7-40.

Plots of voltage versus specific capacity of the coin cell battery formed from 22 nm aluminum fluoride coated LMO material and 0.33 are shown in FIG. 11(a) for the 1st cycle at discharge rate of 0.1 C and FIG. 11(b) for the 7th cycle at a discharge rate of C/3. The first cycle specific capacity of the battery at 0.1 C discharge rate was about 260 mAh/g. The 7th cycle specific capacity of the battery at 0.33 C discharge rate was about 235 mAh/g. Specific capacity versus cycle of the coin cell battery was also tested and the results are shown in FIG. 12. The battery maintained approximately 98% specific capacity after going through 40 charge and discharge cycles relative to the 7th cycle specific capacity.

Figure 13:
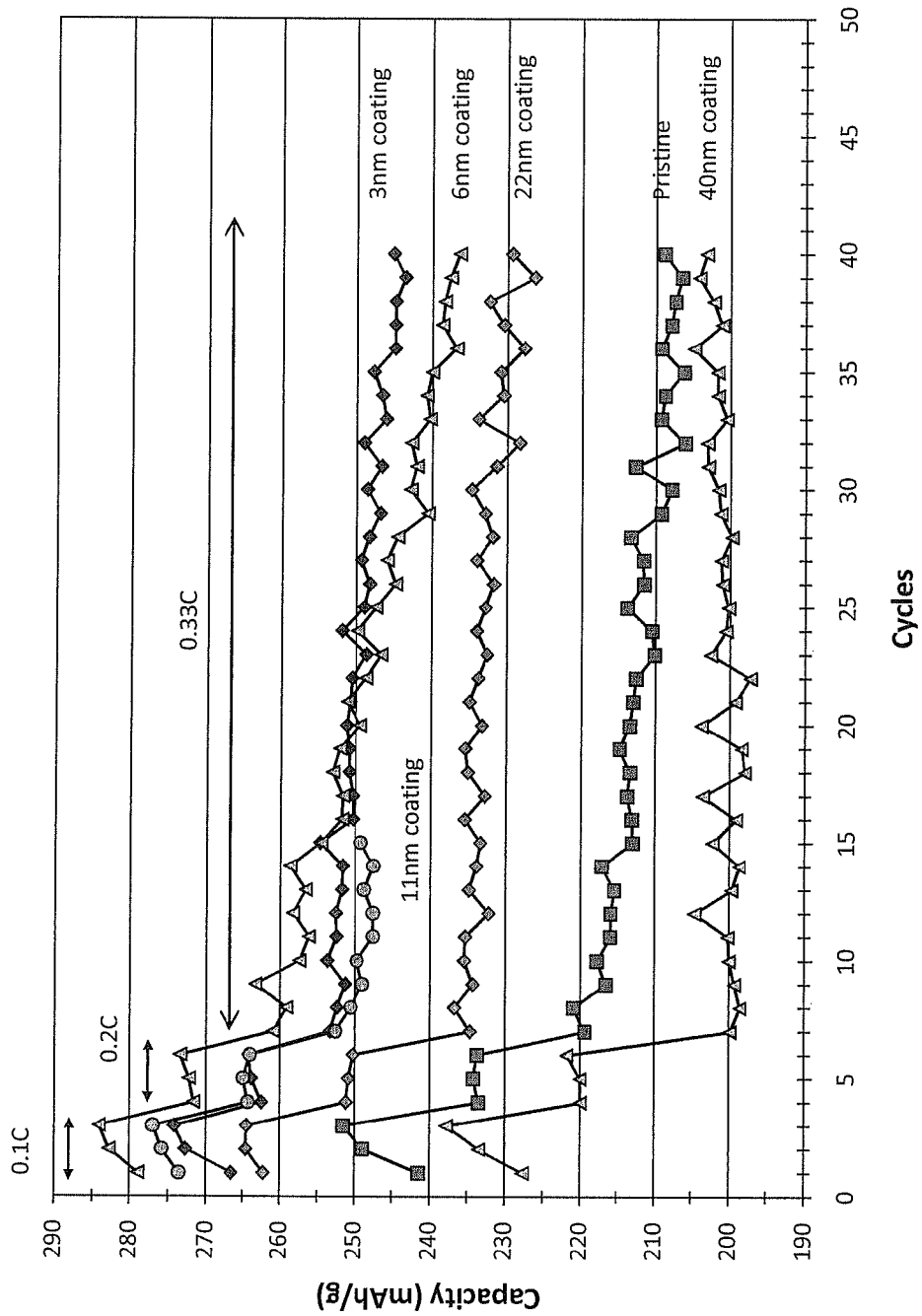
FIG. 13 is a set comparison plots of specific discharge capacity versus cycle number for a high specific capacity cathode lithium metal oxide material, uncoated and five different $AlF_3$ coating thicknesses, cycled at 0.1 C for the first three cycles, 0.2 C for cycle numbers 4-6 and 0.33 C for cycle 7-40.

Specific capacity versus cycle of the coin cell batteries formed from uncoated, 3 nm, 6 nm, 11 nm, 22 nm, and 40 nm aluminum fluoride coated LMO materials were tested and the results are shown in FIG. 13. Batteries with the coated LMO materials showed a complex relationship between specific capacity performance as a function of the coating thickness. Batteries with LMO materials having a 6 nm aluminum fluoride coating had the highest specific capacity at low cycle number, while batteries with LMO materials having a 4 nm aluminum fluoride coating had the highest capacity at 40 cycles. Battery with LMO materials having 40 nm coating had the lowest specific capacity, which was lower than the battery with the uncoated material, but this battery exhibited a slight increase in capacity with cycling.

Figure 14:
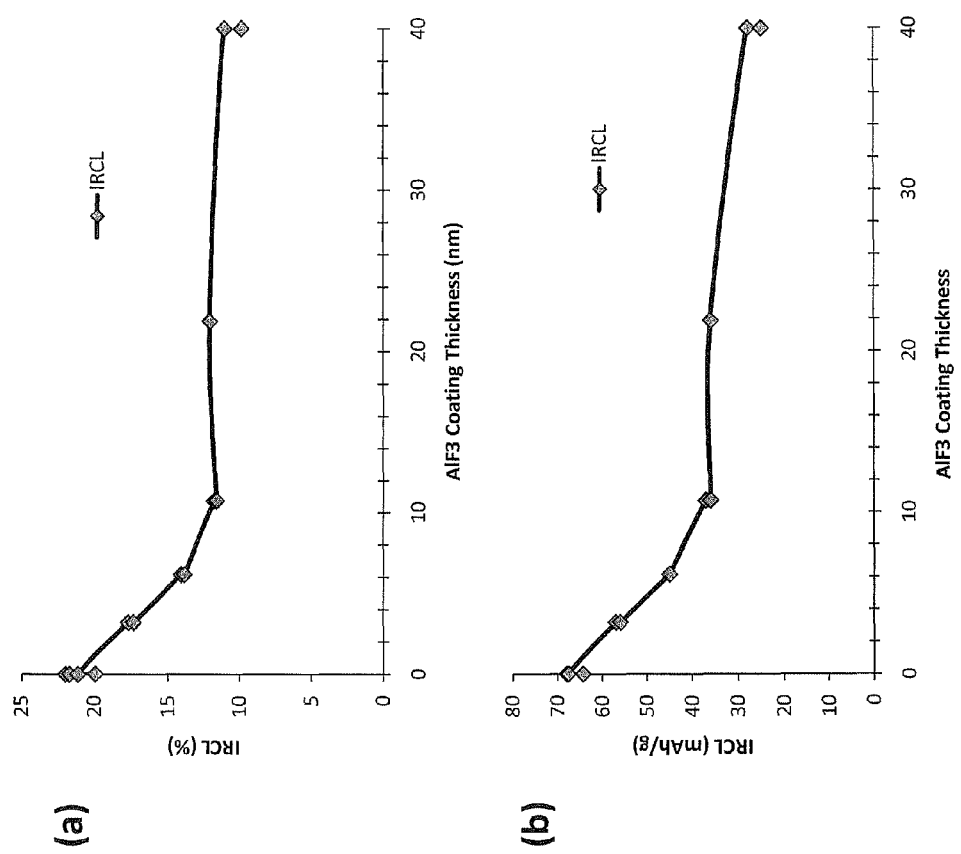
FIG. 14 is a set of two plots of (a) percentage irreversible capacity loss (IRCL) versus $AlF_3$ coating thickness and (b) specific IRCL versus $AlF_3$ coating thickness of the high specific capacity cathode material.

The first cycle irreversible capacity loss (IRCL) of the batteries having uncoated, 3 nm, 6 nm, 11 nm, 22 nm, and 40 nm aluminum fluoride coated LMO materials were measured. A plot of the results in percentage of overall capacity versus coating thickness is shown in FIG. 14a, and a plot of the results in specific capacity change as a function of coating thickness is shown in FIG. 14b. The IRCL results showed a steady decrease of the IRCL for batteries with coating thicknesses to about 10 nm, and the IRCL roughly leveled off with for batteries having 11 nm, 22 nm, and 40 nm aluminum fluoride coated LMO materials.

Figure 15:
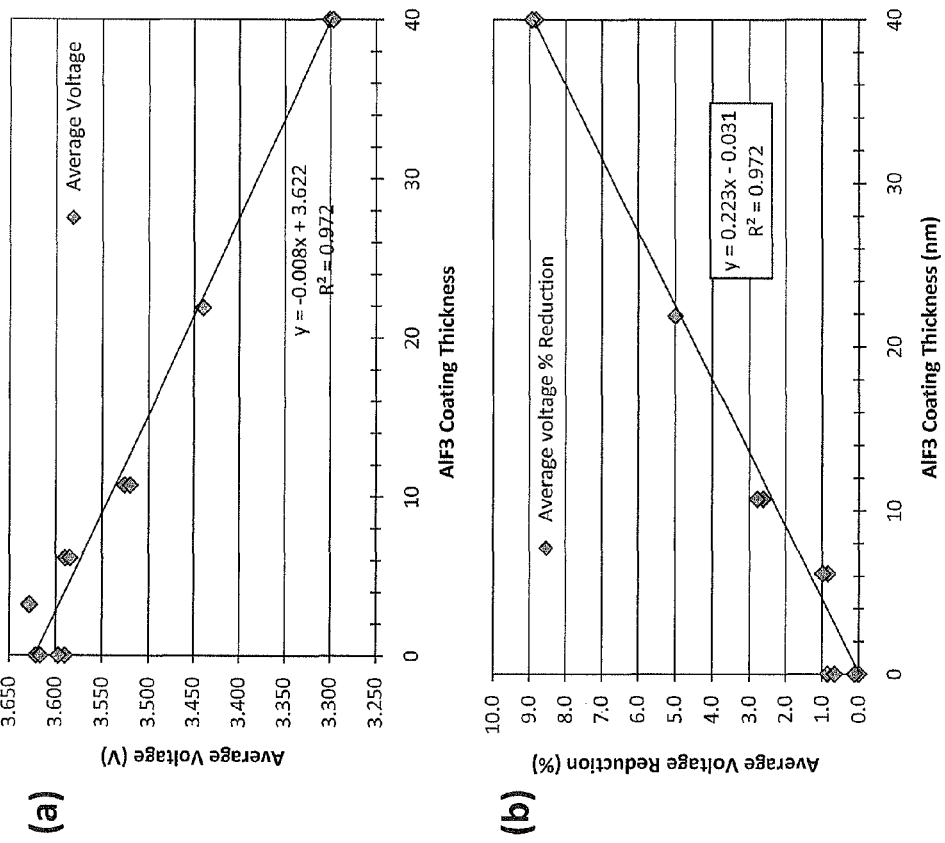
FIG. 15 is a set of two plots of (a) average voltage versus $AlF_3$ coating thickness and (b) percentage of average voltage reduction versus $AlF_3$ coating thickness of the high specific capacity cathode material.

The average voltages of the batteries were measured for batteries having positive electrodes with uncoated, 3 nm, 6 nm, 11 nm, 22 nm, and 40 nm aluminum fluoride coated LMO materials. The average voltage was taken over a discharge from 4.6V to 2.0V. A plot of average voltage as a function of coating thickness is shown in FIG. 15a, and a plot of percentage of voltage reduction relative to the uncoated material performance versus coating thickness is shown in FIG. 15b. The average voltage generally showed a decrease versus increased aluminum fluoride coating thickness on the LMO materials, although the decrease in average voltage was small for coatings of 6 nm or less.

Figure 16:
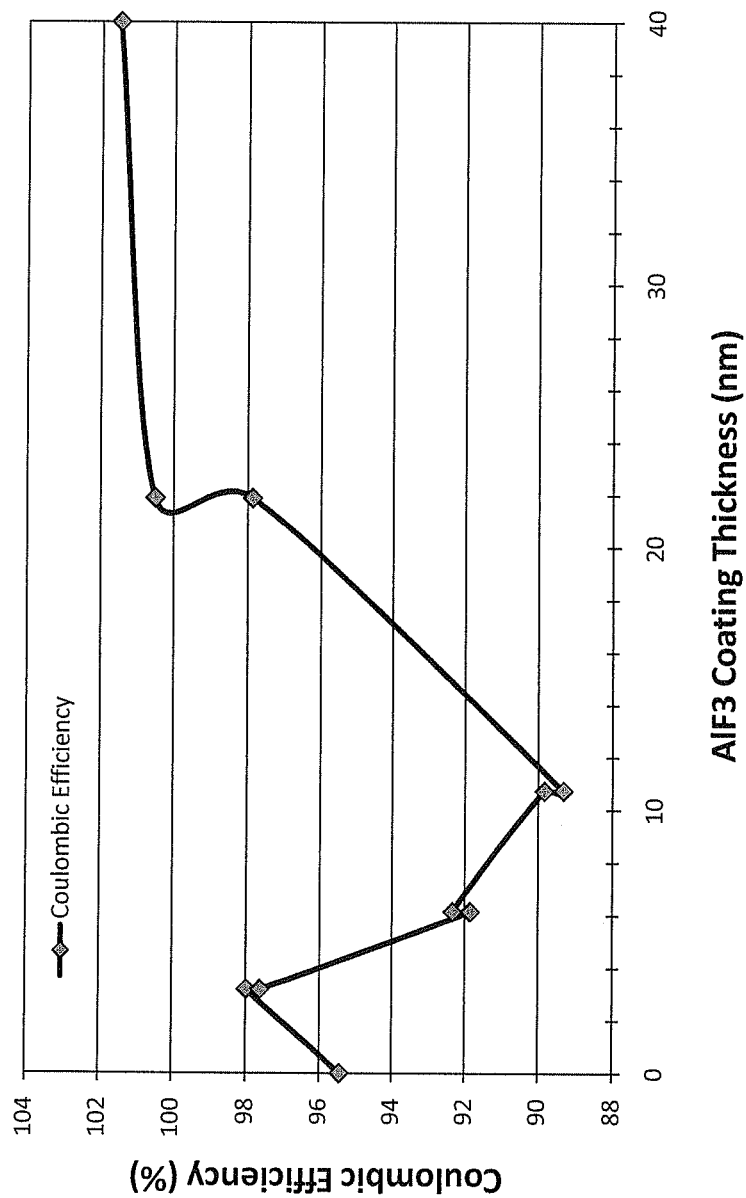
FIG. 16 is a plot of coulombic efficiency between the first and $34^{th}$ cycles cycled at 0.33 C versus $AlF_3$ coating thickness of the high specific capacity cathode material.

Additionally, the coulombic efficiency of the batteries having uncoated, 3 nm, 6 nm, 11 nm, 22 nm, and 40 nm aluminum fluoride coated LMO materials were measured. As used here, the coulombic efficiency is evaluated as the specific capacity at cycle 40 as a percentage of the specific capacity at cycle 7, the first cycle at a rate of C/3. In other words, the coulombic efficiency is 100×(specific capacity at cycle 40)/(specific capacity at cycle 7). A plot of the coulombic efficiency as a function of coating thickness is shown in FIG. 16. The coulombic efficiency increased by about 2% when coating thickness is increased from zero to 3 nm. The coulombic efficiency then decreased significantly when coating thickness is increased from 3 nm to 6 nm and 11 nm. The coulombic efficiency increased dramatically for batteries formed with positive electrode active materials when the coating thickness was 22 nm and 40 nm.

Example 4—Materials with Metal Bifluoride Coatings and Corresponding Batteries

This example described the formation of coating of $MgF_2$, $CaF_2$, $BaF_2$ and $SrF_2$ on the lithium rich metal oxides, and corresponding coil cell data is presented indicating the improved performance for the coated materials.

Figure 17:
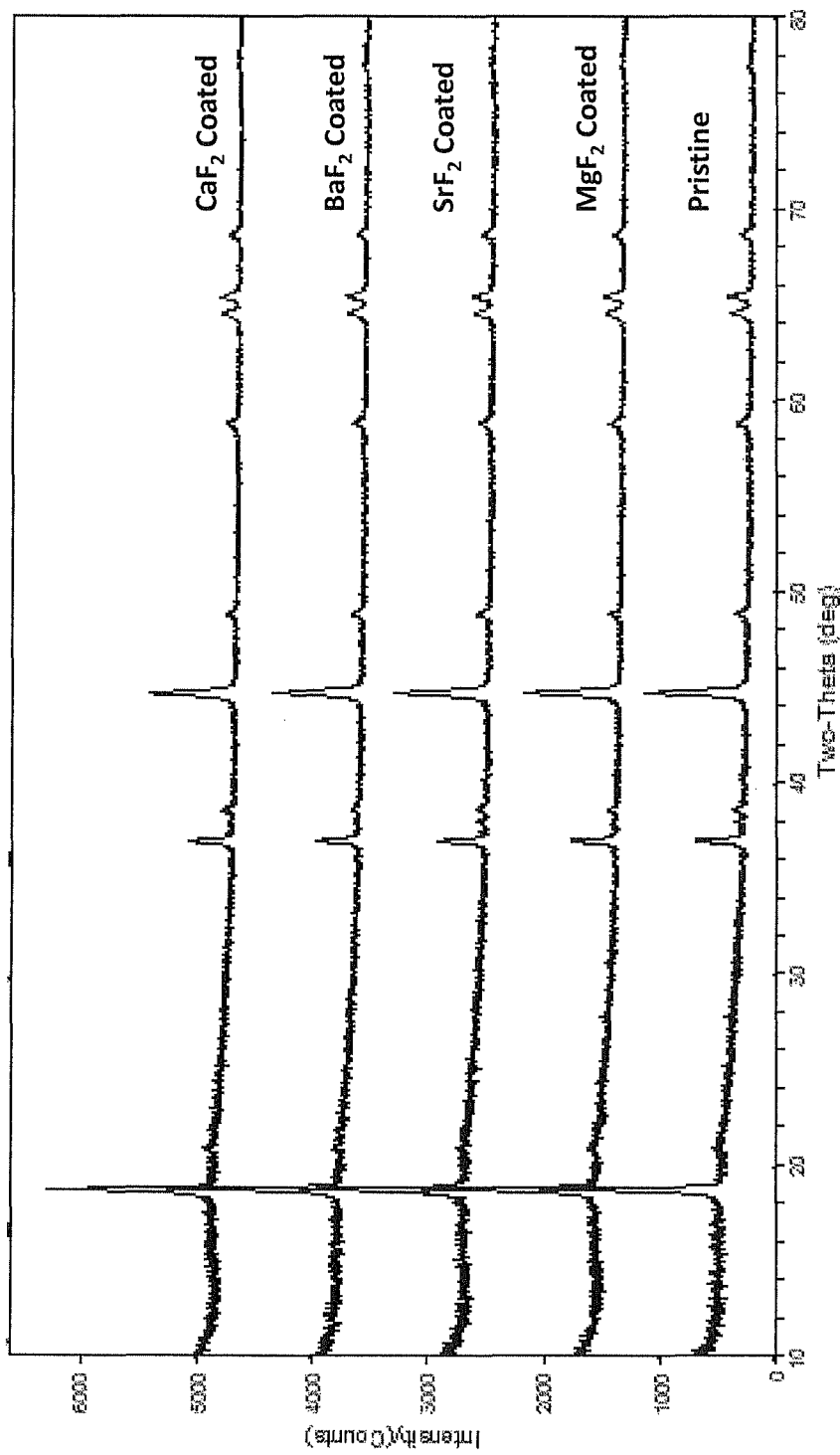
FIG. 17 is a plot of x-ray diffractograms for a lithium metal oxide with one of four different metal bifluoride coatings.

Samples of lithium metal oxide (LMO) particles synthesized as described in Example 1 were coated with 1-4 nm of $MgF_2$, $CaF_2$, $BaF_2$ and $SrF_2$. A stoichiometric amount of the selected metal nitrate, such as magnesium nitrate, was dissolved in water and mixed with the corresponding amount of the lithium metal oxide under constant stirring. Then, ammonium fluoride was added to the mixture slowly while continuing the stirring. After the addition of an excess of ammonium fluoride, the mixture was heated to about 80° C. for about 5 hours. After the deposition was completed, the mixture was filters and calcined at 450° C. for 5 hours under a nitrogen atmosphere. The x-ray diffraction pattern of the metal bifluoride coated LMO samples in FIG. 17 along with the diffractogram for the corresponding pristine, i.e., uncoated, sample. All of the x-ray diffractograms exhibit characteristics of a rock-salt type structure as the uncoated LMO sample. Transmission electron micrographs are shown in FIGS. 18A and 18B for $MgF_2$ (A) coated samples and $SrF_2$ (B) coated samples.

Figure 19:
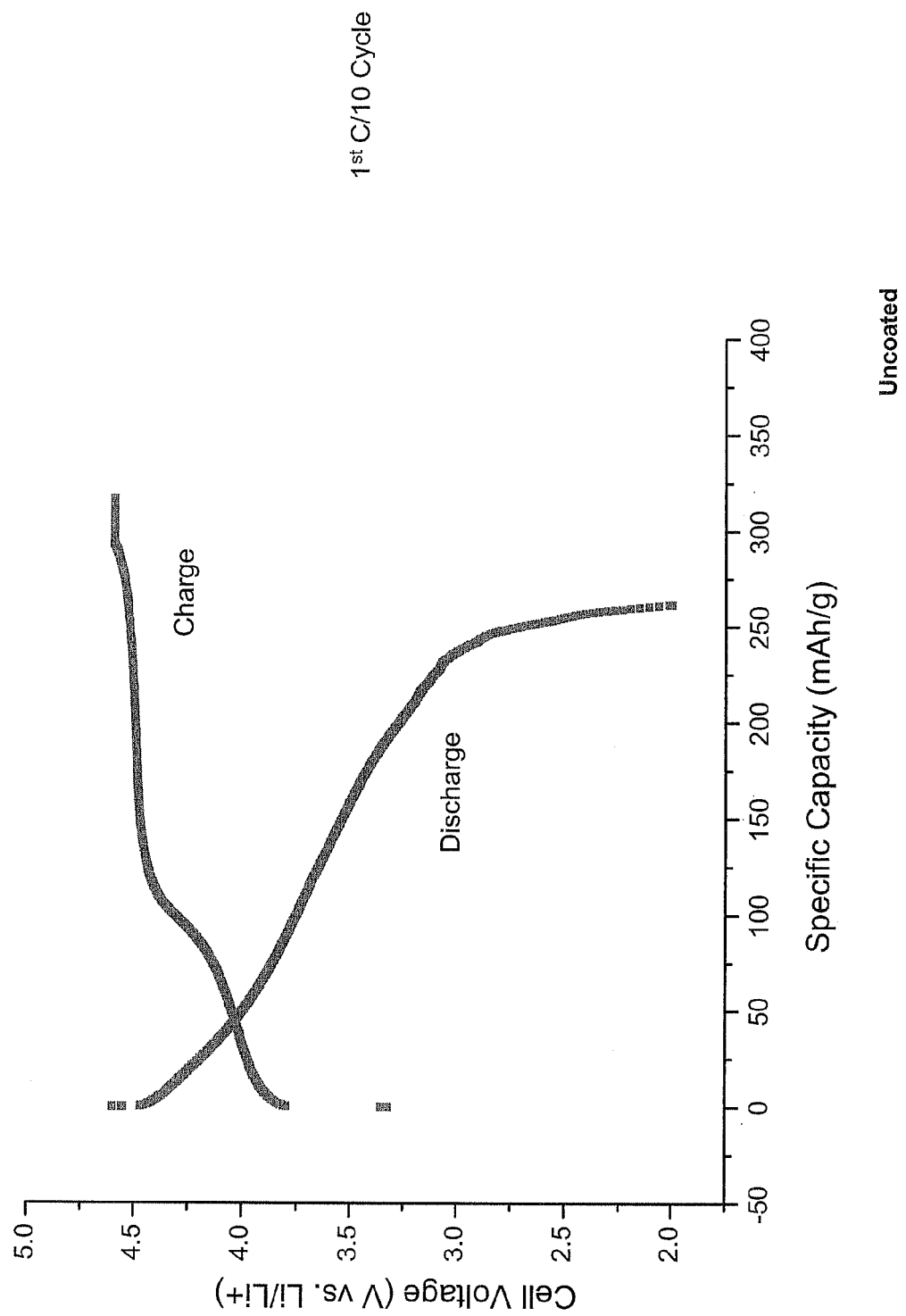
FIG. 19 is a plot of cell voltage versus specific capacity for the first charge and discharge cycle at a rate of C/10 for a battery formed with an uncoated high capacity positive electrode active material.
Figure 20:
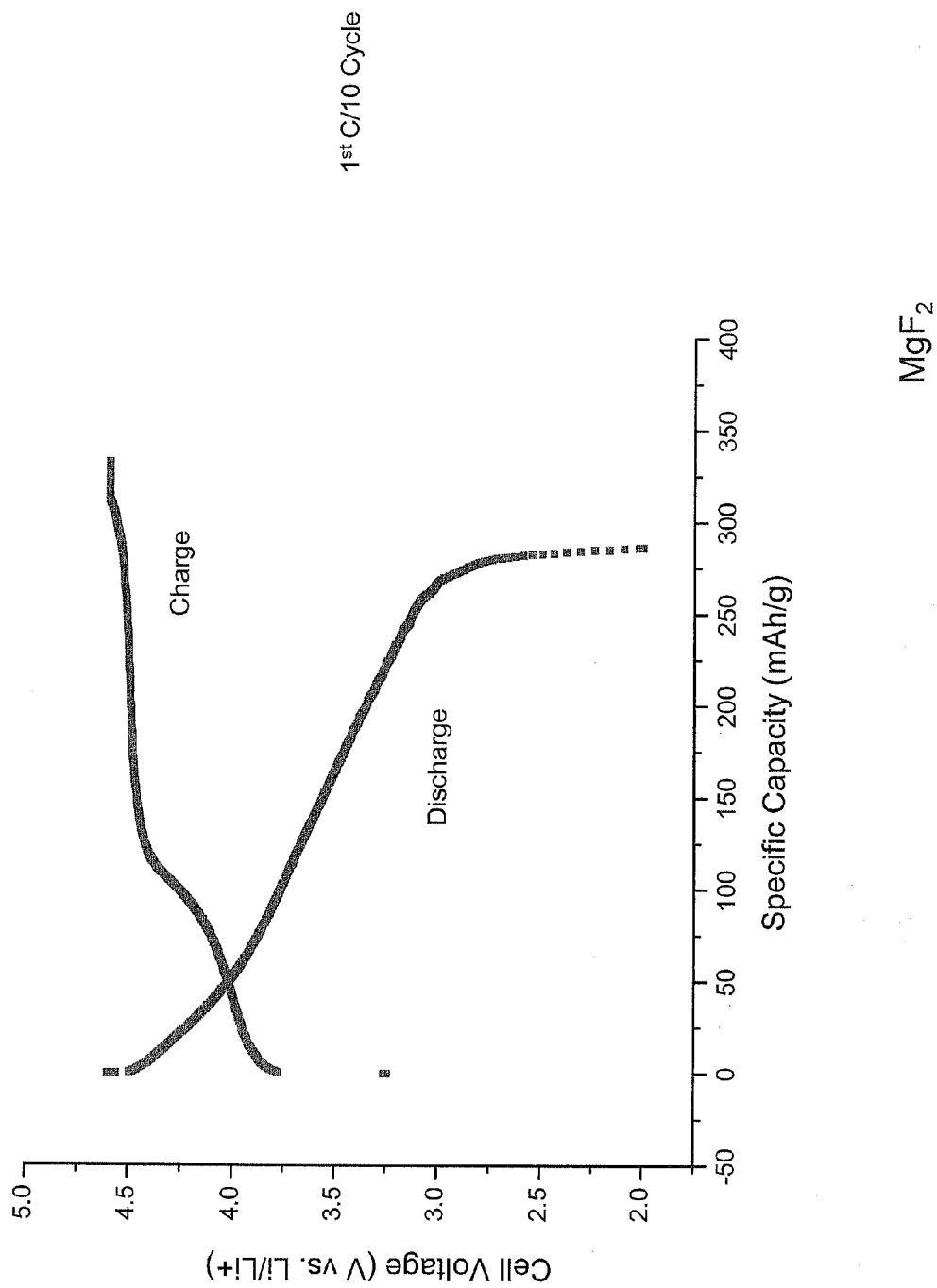
FIG. 20 is a plot of cell voltage versus specific capacity for the first charge and discharge cycle at a rate of C/10 for a battery formed with a high capacity positive electrode active material coated with $MgF_2$.
Figure 21:
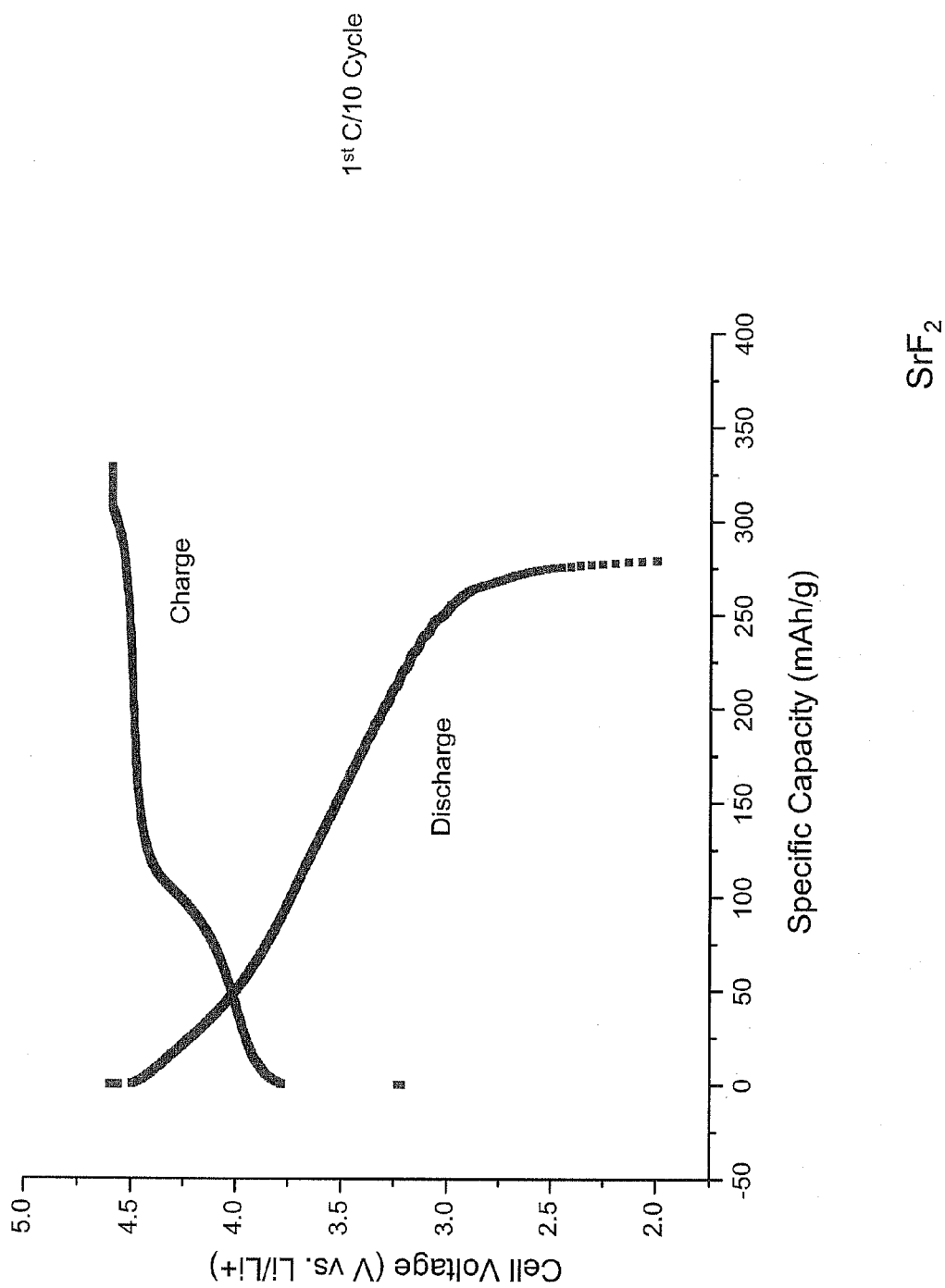
FIG. 21 is a plot of cell voltage versus specific capacity for the first charge and discharge cycle at a rate of C/10 for a battery formed with a high capacity positive electrode active material coated with $SrF_2$.
Figure 22:
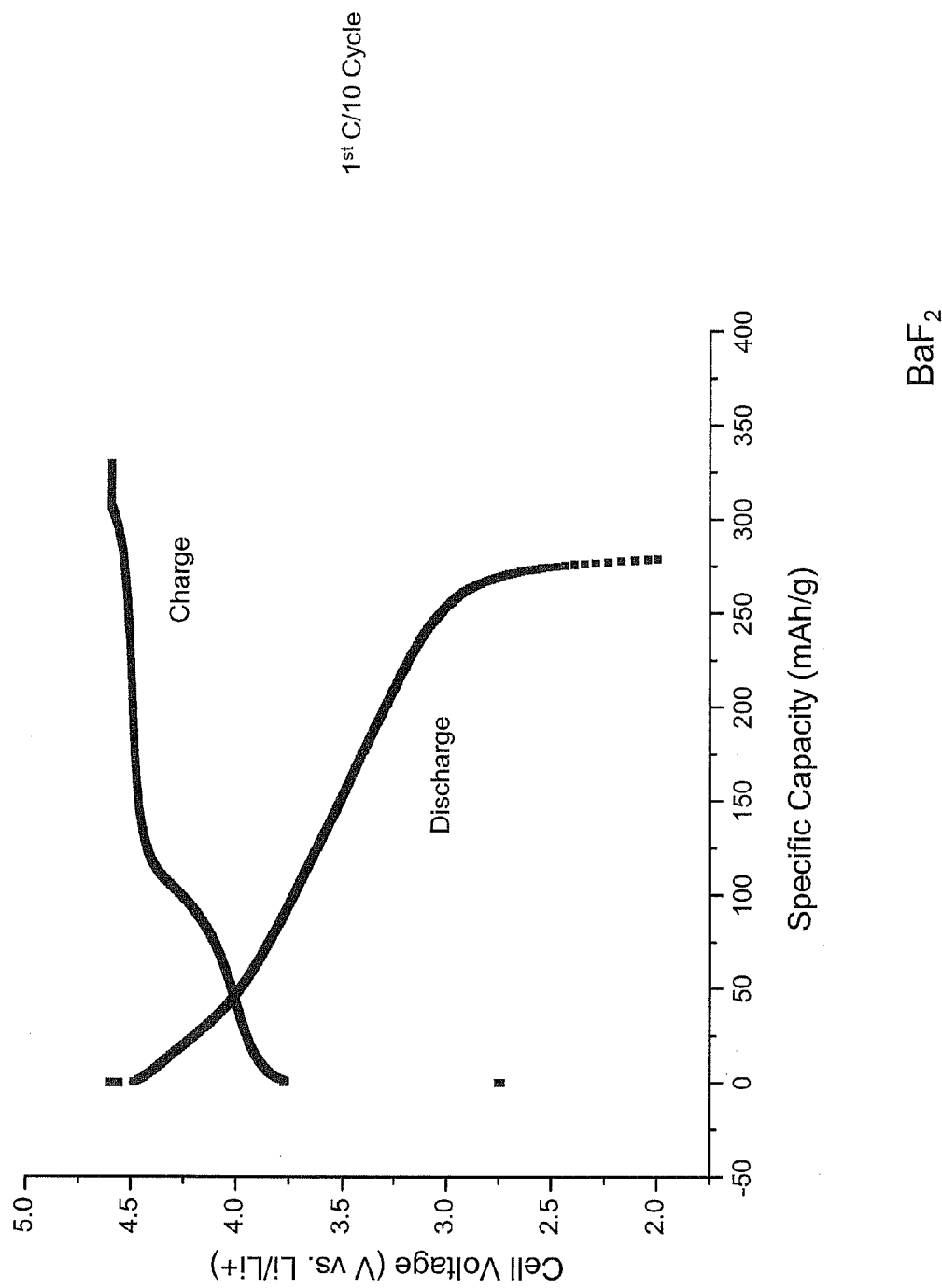
FIG. 22 is a plot of cell voltage versus specific capacity for the first charge and discharge cycle at a rate of C/10 for a battery formed with a high capacity positive electrode active material coated with $BaF_2$.
Figure 23:
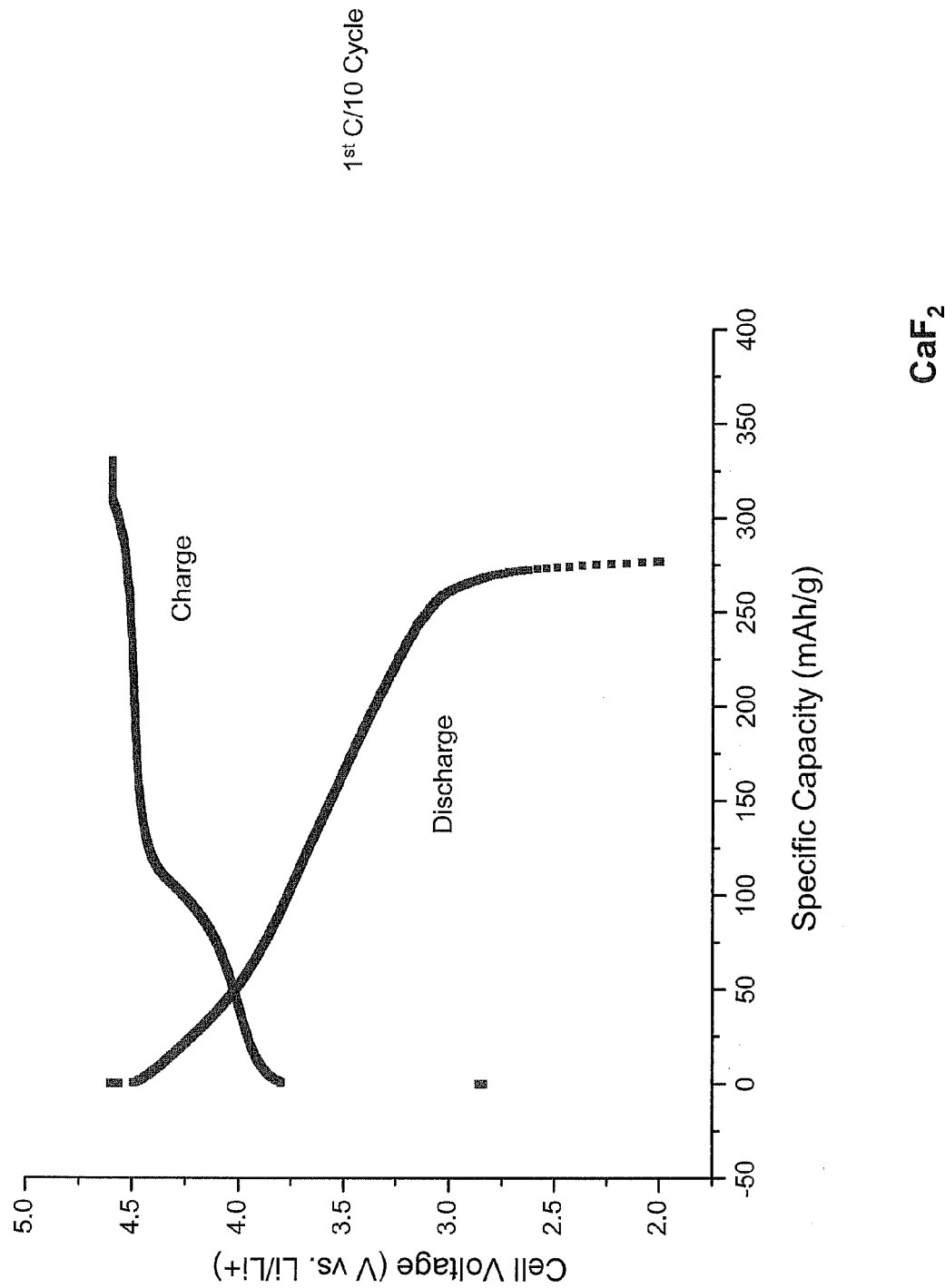
FIG. 23 is a plot of cell voltage versus specific capacity for the first charge and discharge cycle at a rate of C/10 for a battery formed with a high capacity positive electrode active material coated with $CaF_2$.
Figure 24:
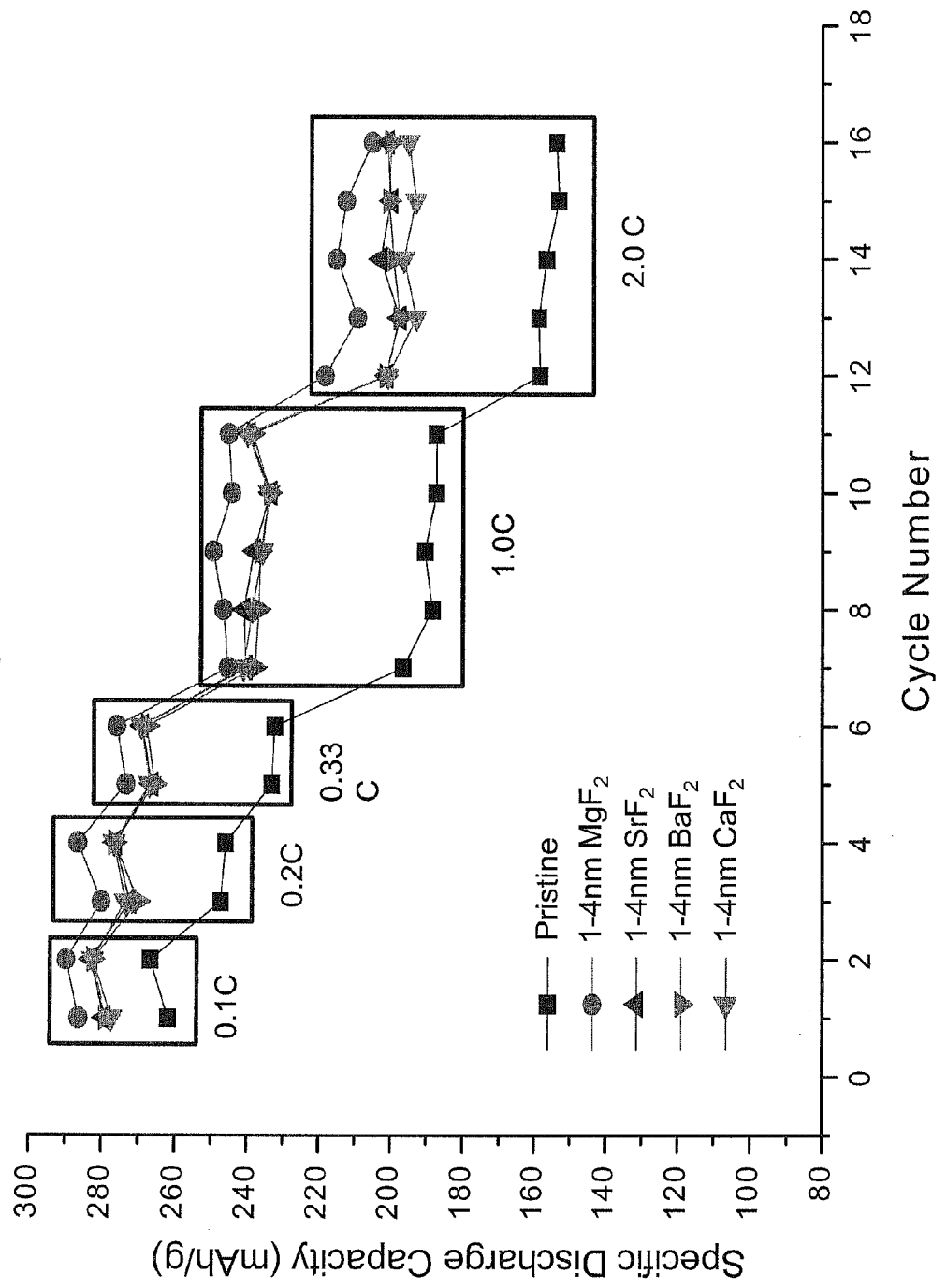
FIG. 24 is a plot of specific discharge capacity as a function of cycle number for five batteries respectively formed with uncoated positive electrode active materials or with positive electrode active materials coated with $MgF_2$, $SrF_2$, $BaF_2$ or $CaF_2$.

The metal bifluoride coated LMOs were used to form coin cell batteries following the procedure outlined above. A plot of the voltage from 4.6 V to 2.0 V versus specific charge and discharge capacity is shown in FIG. 19 for the first cycle for the uncoated material at a rate of C/10. This batch of LMO material had a slightly greater specific capacity compared with the uncoated material used to obtain FIG. 4a. Corresponding plots of voltage versus specific charge and discharge capacities are presented in FIGS. 20-23 for $MgF_2$, $SrF_2$, $BaF_2$ and $CaF_2$, respectively, at a rate of C/10. These four first cycle plots for batteries with positive electroactive materials having different metal bifluoride coatings exhibited similar first cycle performance with the materials having an $MgF_2$ coating exhibiting a somewhat higher discharge specific capacity. These cells were cycled for 16 cycles with a rate of C/10 for cycles 1 and 2, C/5 for cycles 3 and 4, C/3 for cycles 5 and 6, 1 C for cycles 7-11 and 2 C for cycles 12-16. The cycling results are presented in FIG. 24. All of the batteries prepared with coated samples exhibited significantly greater discharge specific capacity at all rates relative to a battery formed with the uncoated composition. The batteries formed with materials having a coating of $SrF_2$, $BaF_2$ and $CaF_2$ exhibited similar performance while the battery formed with the positive electroactive material coated with $MgF_2$ exhibited somewhat greater specific discharge capacity at all rates.

Example 5—Coin Cells Formed with $AlF_3$ Coated Compositions

The Example explores the battery performance for coin cell batteries using graphite as the negative electrode active materials.

Lithium metal oxide (LMO) powders produced as described in Example 1 were mixed thoroughly with conductive carbons, such as a mixture acetylene black and graphite, to form a homogeneous powder mixture comprising from 10-20 weight percent conductive carbon. Separately, polyvinylidene fluoride (PVDF) was mixed with N-methyl-pyrrolidone (NMP) and stirred overnight to form a PVDF-NMP solution. The homogeneous powder mixture was then added to the PVDF-NMP solution and mixed for 2-6 hours to form homogeneous slurry. The slurry was applied onto an aluminum foil current collector to form a thin wet film using a commercial coater.

A positive electrode structure was formed by drying the aluminum foil current collector with the thin wet film electrode to remove NMP. The positive electrode and current collector were pressed together between rollers of a sheet mill to obtain a positive electrode with desired thickness in association with the foil current collector.

A blend of graphite, optional conductive carbon and binder was used as the negative electrode to have from about 80-99 weight percent graphite. The negative electrode composition was coated onto a copper foil current collector and dried. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrode stack with the positive electrode-separator-negative electrode was placed within coin cells. The electrolyte was a 1 M solution of $LiPF_6$ form by dissolving $LiPF_6$ salt in a mixture of ethylene carbonate, diethyl carbonate and dimethyl carbonate (from Ferro Corp., Ohio USA) at a 1:1:1 volumetric ratio. The electrolyte was placed in the cell with the electrode stack and the coin cell was sealed.

Figure 25:
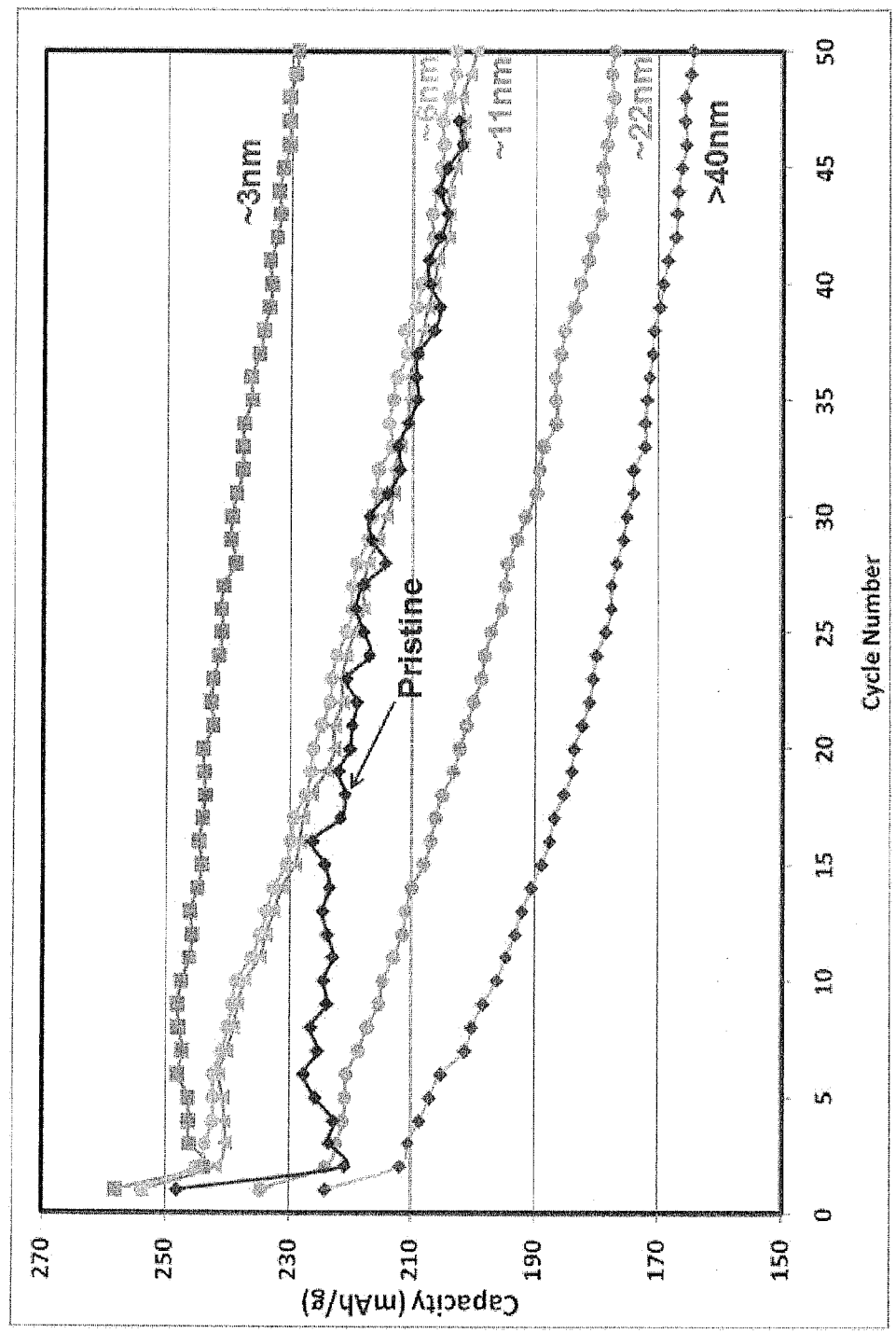
FIG. 25 is a graph with plots of specific discharge capacity as a function of cycle number for coin cell batteries formed with a negative electrode comprising graphite and a positive electrode having a high capacity active material that is uncoated or coated with an indicated average thickness of $AlF_3$.

The resulting batteries were tested with a Maccor cycle tester to obtain charge-discharge curve and cycling stability over a number of cycles. The first cycle was performed at a rate of C/10, and cycles 2-50 were performed at a rate of C/3. The results for the uncoated, i.e., pristine, sample and samples with 5 different $AlF_3$ coating thicknesses are plotted in FIG. 25 in terms of specific capacity as a function of cycle. The batteries formed with an $AlF_3$ coating having a thickness of 3 nm showed significantly greater specific capacities after the first few cycles.

Example 6—Alternative Positive Electroactive Composition with $AlF_3$ Coatings and Corresponding Batteries This example demonstrates battery performance results with an alternative electroactive material for the positive electrode having a selected amount of $AlF_3$ coating composition.

The positive electrode active material was synthesized as described in Example 1. However, the product composition used for the positive electrodes of the batteries in this example was $Li_{1.07}Ni_{0.31}Co_{0.31}Mn_{0.31}O_2$. Particles of the product composition were coated with $AlF_3$ as described in Example 2. Samples were prepared with different amounts of $AlF_3$ coating compositions. Representative transmission electron micrographs are given in FIGS. 26A and 26B showing average coating thicknesses of about 3 nm (A) and about 17 nm (B).

Coin cell batteries were formed using the process and coin cell structure described above. The cells were cycled to evaluate their performance. The first two cycles were measured at a charge/discharge rate of 0.1 C. The subsequent cycles 3-18 were measured at a charge/discharge rate of 0.33 C. One set of samples were cycled between 2.0V and 4.3 V while a second set of samples were cycled from 2.0V to 4.5V.

Figure 27:
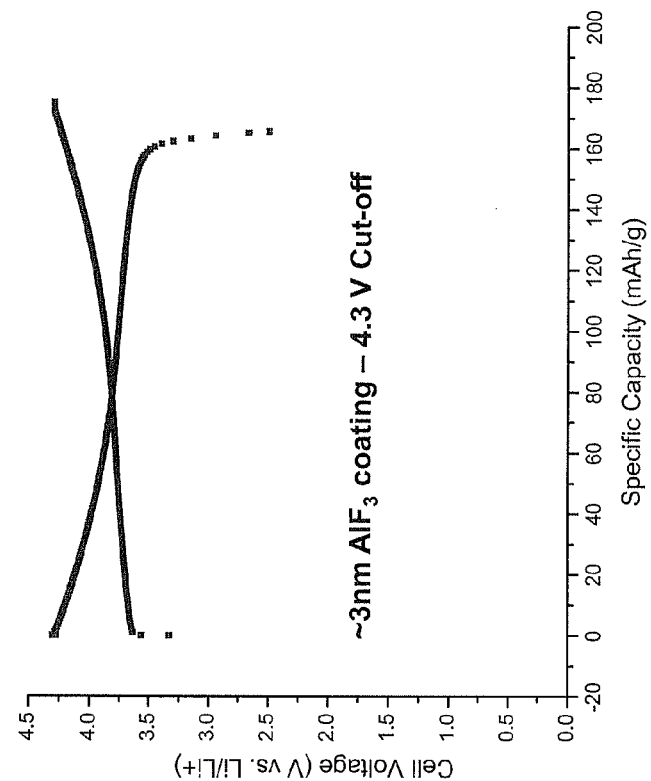
FIG. 27 is a plot of cell voltage versus specific capacity for the first charge and discharge cycle at a rate of C/10 for a battery formed with an alternative positive electrode active material with cycling between 2.0V and 4.3V.
Figure 28:
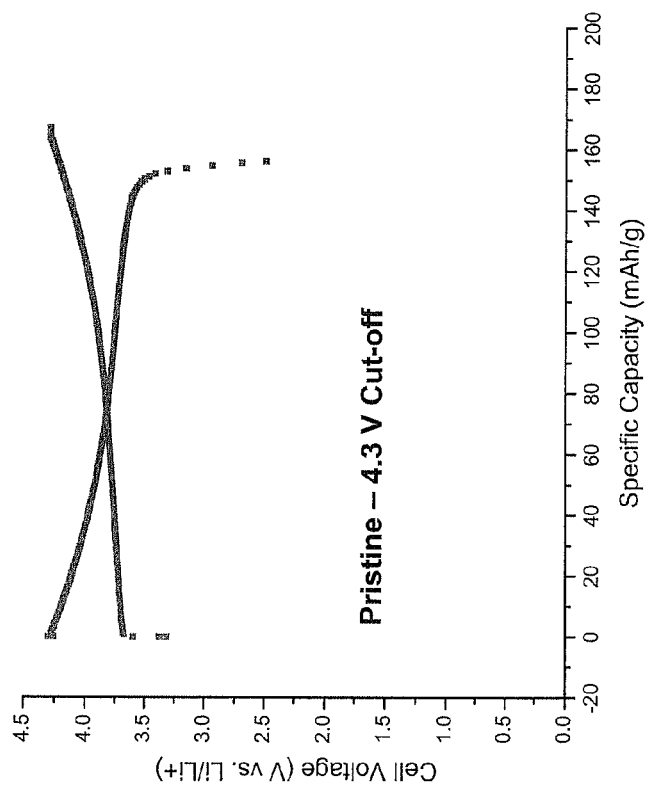
FIG. 28 is a plot of cell voltage versus specific capacity for the first charge and discharge cycle at a rate of C/10 for a battery formed with the alternative positive electrode active material having an $AlF_3$ coating with cycling between 2.0V and 4.3V.

The voltage as a function of specific capacity is plotted in FIGS. 27 and 28 for an uncoated positive electrode active material and a positive electrode active material with uncoated active material (FIG. 27) or about 3 nm thickness $AlF_3$ coating (FIG. 28) for cycling between 2.0V and 4.3V. The battery formed with the coated sample exhibited a greater discharge capacity and a corresponding reduction in irreversible capacity loss. Similar results were found with cycling between 2.0V and 4.5V. The plots of voltage as a function of specific capacity for cycling between 2.0V and 4.45V are presented in FIGS. 29 and 30, respectively, for positive electrode active materials that are uncoated (FIG. 29) or with a approximately 3 nm $AlF_3$ coating (FIG. 30). As expected, the charge and discharge capacities are greater for the cycling to a higher voltage.

Specific capacity versus cycle of the coin cell batteries formed from uncoated, 3 nm, 8 nm, 17 nm, 22 nm, and 47 nm aluminum fluoride coated LMO materials were tested for cycling between 2.0V and 4.3V as well as 2.0V to 4.5V. The specific discharge capacity as a function of cycle for cycling between 2.0V and 4.3V are shown in FIG. 31, and the specific discharge capacity as a function of cycle for cycling between 2.0V and 4.5V are shown in FIG. 32. Batteries with the present coated LMO materials showed a specific capacity performance that decreased with increasing coating thickness, although some materials with different coating thicknesses had essentially identical specific capacity results, as seen in FIGS. 31 and 32. The material with the thickest coating consistently had lower specific capacity than the uncoated materials, while the remaining coated materials exhibited a greater specific capacity relative to the uncoated materials. These results are qualitatively consistent with the result in FIGS. 13 and 25 in which thick coating have a lower specific capacity than uncoated samples and thin coatings achieve the best specific capacity performance upon cycling.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A lithium ion battery positive electrode material comprising an active composition coated with an inorganic coating composition,
   wherein the coating composition comprises a metal/metalloid fluoride and has an average thickness from about 0.5 nanometers (nm) to about 12 nm,
   wherein the active composition can be approximately represented by a formula $Li_{1+x}Ni_\alpha Mn_\beta Co_\gamma A_\delta O_2$, where x ranges from about 0.05 to about 0.25, $\alpha$ ranges from about 0.1 to about 0.4, $\beta$ ranges from about 0.4 to about 0.65, $\gamma$ ranges from about 0 to about 0.3, and $\delta$ ranges from about 0 to about 0.1, and where A is Mg, Zn, Al, Ga, B, Zr, Ti, Ca, Ce, Y, Nb, Cr, Fe, V, Li or combinations,
   wherein the material exhibits an average voltage that is no more than about 2 percent less than the average voltage of the same active composition without the coating, when cycled from 2V to 4.6V against lithium at a rate of C/10, and
   wherein the material comprises substantially spherically shaped particles with relatively homogenous size.

2. The positive electrode material of claim 1 wherein the coating composition comprises $AlF_3$, $MgF_2$, $CaF_2$, $SrF_2$ or $BaF_2$.

3. The positive electrode material of claim 1 wherein the coating has an average thickness no more than about 8 nm.

4. The positive electrode material of claim 1 wherein the coating has an average thickness from about 1 nm to about 8 nm.

5. The positive electrode material of claim 1 wherein the active composition can be approximately represented by a formula of $bLiM'O_2 \cdot (1-b) Li_2M''O_3$, where M' represents one or more metal ions having an average valance of +3 and M" represents one or more metal ions having an average valance of +4 and $0<b<1$.

6. The positive electrode material of claim 5 wherein M" is Mn and M' is a combination of Ni, Co, and Mn.

7. The positive electrode material of claim 1 wherein the active composition can be approximately represented by a formula $Li_{1+x}Ni_\alpha Mn_\beta Co_\gamma O_2$, where x ranges from about 0.05 to about 0.25, $\alpha$ ranges from about 0.1 to about 0.4, $\beta$ ranges from about 0.3 to about 0.65, and $\gamma$ ranges from about 0.05 to about 0.4.

8. The positive electrode material of claim 1 having a specific capacity of at least about 245 mAh/g with a discharge rate of C/3 when discharged from 4.6V to 2.0 V at room temperature.

9. A battery comprising the positive electrode material of claim 1 and a non-aqueous electrolyte comprising lithium ions.

10. A lithium ion battery comprising a positive electrode, a negative electrode comprising a lithium incorporation composition, a separator between the positive electrode and the negative electrode and an electrolyte comprising lithium ions,
 wherein the positive electrode comprises the positive electrode active material of claim 1 having a discharge specific capacity of at least about 190 mAh/g with a discharge rate of 2 C from 4.6 volts to 2.0 volts at room temperature for the fifteenth charge/discharge cycle, distinct electrically conductive powders and a polymer binder.

11. The lithium ion battery of claim 10 wherein the negative electrode comprises graphitic carbon.

12. The lithium ion battery of claim 10 wherein the irreversible capacity loss is reduced by at least about 10% relative to the irreversible capacity loss of an equivalent battery formed with the uncoated active composition.

13. The positive electrode material of claim 1 having a tap density of at least about 1.3 g/mL.

14. The positive electrode material of claim 1 having a discharge specific capacity of at least about 245 mAh/g, an average voltage of at least about 3.55 volts and a capacity at the 40th cycle that is at least about 90% of the capacity at the 10th cycle with a discharge rate of C/3 from 4.6 volts to 2.0 volts at room temperature.

15. The positive electrode material of claim 1 having a specific capacity of at least about 250 mAh/g with a discharge rate of C/3 from 4.6 volts to 2.0 volts at room temperature.

16. The positive electrode material of claim 1 having a capacity at 40 cycles that is at least about 95% of the capacity at the 10th cycle with a discharge rate of C/3 from 4.6 volts to 2.0 volts at room temperature.

17. The positive electrode material of claim 1 wherein the sum $x+\alpha+\beta+\gamma$ approximately equals to 1.0.

* * * * *